US012806920B2

(12) United States Patent
Nonaka et al.

(10) Patent No.: US 12,806,920 B2
(45) Date of Patent: Nov. 24, 2026

(54) INKJET PRINTER

(71) Applicant: Roland DG Corporation, Hamamatsu (JP)

(72) Inventors: Ryosuke Nonaka, Hamamatsu (JP); Yukihiro Tokunaga, Hamamatsu (JP); Naoki Kotobuki, Hamamatsu (JP); Ryo Baba, Hamamatsu (JP); Yusuke Takano, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 21 days.

(21) Appl. No.: 18/225,781

(22) Filed: Jul. 25, 2023

(65) Prior Publication Data

US 2023/0364930 A1 Nov. 16, 2023

Related U.S. Application Data

(63) Continuation of application No. PCT/JP2021/048338, filed on Dec. 24, 2021.

(30) Foreign Application Priority Data

Jan. 26, 2021 (JP) ................................ 2021-010272

(51) Int. Cl.
*B41J 11/00* (2006.01)
*B41J 29/377* (2006.01)

(52) U.S. Cl.
CPC ....... *B41J 11/00222* (2021.01); *B41J 29/377* (2013.01)

(58) Field of Classification Search
None
See application file for complete search history.

(56) References Cited

U.S. PATENT DOCUMENTS

| | | | | |
|---|---|---|---|---|
| 8,845,066 | B2 * | 9/2014 | Domae | B41J 29/377 347/18 |
| 10,173,440 | B2 * | 1/2019 | Nakano | B41J 11/00216 |
| 10,245,849 | B2 * | 4/2019 | Valero Navazo | H05B 3/00 |
| 2005/0151815 | A1 | 7/2005 | Kanai et al. | |

(Continued)

FOREIGN PATENT DOCUMENTS

| | | |
|---|---|---|
| CN | 102501600 B | 12/2014 |
| JP | 2005059478 A | 3/2005 |

(Continued)

OTHER PUBLICATIONS

Official Communication issued in International Patent Application No. PCT/JP2021/048338, mailed on Mar. 15, 2022.

*Primary Examiner* — Alejandro Valencia
(74) *Attorney, Agent, or Firm* — Keating & Bennett, LLP

(57) ABSTRACT

A printer includes a dryer to send an airflow toward a recording medium. The dryer includes a first fan, a second fan, a heater, a first intake port, a first exhaust port with an opening facing toward a platen, a second intake port with an opening facing toward a guide, and a second exhaust port with an opening facing toward the guide. The first fan is operable to draw air through the first intake port, and discharge air toward the platen through the first exhaust port. The second fan is operable to draw air through the second intake port, and discharge air that has been heated by the heater through the second exhaust port.

19 Claims, 17 Drawing Sheets

(56) References Cited

U.S. PATENT DOCUMENTS

| | | | |
|---|---|---|---|
| 2010/0188469 | A1 | 7/2010 | Ikegami |
| 2011/0109693 | A1 | 5/2011 | Ohnishi |
| 2013/0328963 | A1 | 12/2013 | Domae |
| 2014/0300674 | A1 | 10/2014 | Sasaki et al. |
| 2015/0029278 | A1 | 1/2015 | Sasaki |
| 2016/0023476 | A1 | 1/2016 | Leighton et al. |
| 2016/0159111 | A1* | 6/2016 | Sasaki ................ B41J 11/00222 347/102 |
| 2016/0332462 | A1 | 11/2016 | Harayama et al. |
| 2016/0355027 | A1 | 12/2016 | Valero Navazo et al. |
| 2018/0004143 | A1 | 1/2018 | Sasaki |
| 2018/0272754 | A1 | 9/2018 | Matsuoka |
| 2020/0207121 | A1 | 7/2020 | Washio |
| 2021/0362516 | A1 | 11/2021 | Yoda et al. |

FOREIGN PATENT DOCUMENTS

| | | | |
|---|---|---|---|
| JP | 2010137483 | A | 6/2010 |
| JP | 2010173177 | A | 8/2010 |
| JP | 2012179802 | A | 9/2012 |
| JP | 2013-144462 | A | 7/2013 |
| JP | 2014108566 | A | 6/2014 |
| JP | 2014-201028 | A | 10/2014 |
| JP | 2015020417 | A | 2/2015 |
| JP | 2016-155294 | A | 9/2016 |
| JP | 2016155292 | A | 9/2016 |
| JP | 2016215428 | A | 12/2016 |
| JP | 2018001501 | A | 1/2018 |
| JP | 2018-159482 | A | 10/2018 |
| JP | 2020-104320 | A | 7/2020 |
| JP | 2021181203 | A | 11/2021 |
| JP | 2021181205 | A | 11/2021 |
| WO | 2004094150 | A1 | 11/2004 |

* cited by examiner

INKJET PRINTER

CROSS REFERENCE TO RELATED APPLICATIONS

This application claims the benefit of priority to Japanese Patent Application No. 2021-010272 filed on Jan. 26, 2021 and is a Continuation Application of PCT Application No. PCT/JP2021/048338 filed on Dec. 24, 2021. The entire contents of each application are hereby incorporated herein by reference.

BACKGROUND OF THE INVENTION

1. Field of the Invention

The present invention relates to an inkjet printer.

2. Description of the Related Art

Inkjet printers that print on a recording medium using an inkjet method have been known in the art. This type of inkjet printer, for example, includes a platen on which a recording medium is placed and an ink head that dispenses ink onto the recording medium placed on the platen. Depending on the type of ink used, some inkjet printers also include a dryer with a heater, a fan, or the like, to dry the ink dispensed onto the recording medium.

For example, JP A 2018-159482 discloses an inkjet printer that includes a dryer having a plurality of fans as a means for accelerating the drying of ink dispensed onto a recording medium. Such a dryer is configured to blow air from above the recording medium toward the recording medium, thus efficiently drying the ink dispensed onto the recording medium.

SUMMARY OF THE INVENTION

Now, water-based ink, which is superior in environmental and health aspects, is sometimes used as ink dispensed from an ink head. Water-based ink includes water, a water-soluble organic solvent, a colorant and a binder resin, or the like, as a fixing component. Since water-based ink includes a relatively large amount of a water component, it can cause a problem that it takes a long time to dry. Therefore, when a dryer as shown in JP A 2018-159482 is used, the drying of the water-based ink on the recording medium conveyed to a position opposing the dryer is accelerated, but the drying of the water-based ink hardly progresses until it is conveyed to the position opposing the dryer, and the quality of the formed image may degrade.

Preferred embodiments of the present invention provide inkjet printers each including a dryer capable of accelerating the drying of water-based ink dispensed onto a recording medium.

An inkjet printer according to a preferred embodiment of the present invention includes a platen to support a recording medium, a carriage positioned upward relative to the platen and movable in a left-right direction, an ink head provided on the carriage to dispense water-based ink onto the recording medium, a guide including an upper wall extending forward and downward on which the recording medium is able to be placed, and positioned forward relative to the platen to guide movement of the recording medium, and a dryer opposing the upper wall of the guide to send an airflow toward the recording medium on the guide. The dryer includes a main body case extending in the left-right direction, a first partition wall that partitions an inside of the main body case into a first chamber and a second chamber, one or more first fans provided in the first chamber, one or more second fans provided in the second chamber, a heater provided in the second chamber to heat air that is sent by the second fan, a first intake port provided in the main body case to take in air from outside the main body case into the first chamber, a first exhaust port provided in the main body case and including an opening facing toward the platen to discharge air of the first chamber, a second intake port provided in the main body case and including an opening facing toward the upper wall of the guide to take in air from outside the main body case into the second chamber, and a second exhaust port provided in the main body case downward relative to the first exhaust port and including an opening facing toward the upper wall of the guide to discharge air of the second chamber that has been heated by the heater.

With an inkjet printer according to a preferred embodiment of the present invention, the dryer can draw air from outside through the first intake port by the first fan and let the air flow into the first chamber. Then, the air flowing in the first chamber is discharged toward the platen through the first exhaust port. Here, since the air flowing in the first chamber is discharged through the first exhaust port, it is possible to send an airflow onto the recording medium on the platen. That is, an airflow can be immediately sent toward water-based ink that has been dispensed from the ink head and landed on the recording medium. Therefore, drying of the water-based ink is accelerated on the platen, and it is possible to improve the quality of the image. Moreover, the dryer can draw air from outside through the second intake port by the second fan and let the air flow into the second chamber. Then, air that has been heated by the heater can be blown onto the guide through the second exhaust port. Therefore, air that has been heated by the heater can be sent to the water-based ink that has been dried on the platen further on the guide. This can further accelerate the drying of the water-based ink dispensed onto the recording medium on the guide.

According to preferred embodiments of the present invention, it is possible to provide inkjet printers each including a dryer capable of accelerating the drying of water-based ink dispensed onto a recording medium.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Inkjet printers (hereinafter referred to simply as "printer") according to preferred embodiments of the present invention will now be described. Note that it is understood that the preferred embodiments described herein are not intended to limit the present invention in particular. Members and portions that realize like functions are denoted by like reference signs, and redundant description will be omitted or simplified as appropriate.

First Preferred Embodiment

Figure 1:
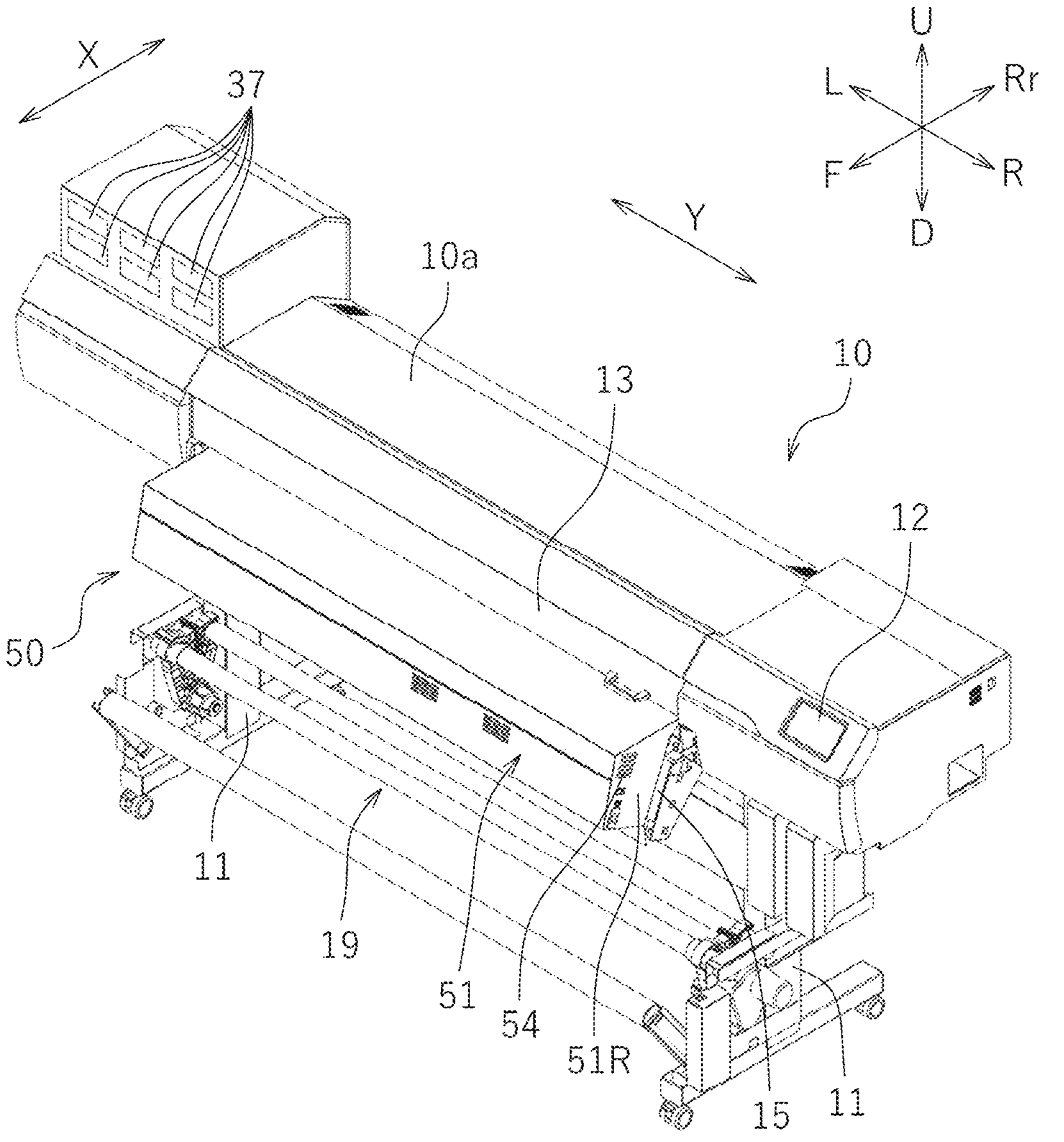
FIG. 1 is a perspective view of a printer according to the first preferred embodiment of the present invention.

FIG. 1 is a perspective view of a printer 10 according to the first preferred embodiment. The printer 10 prints on a recording medium 5 (see FIG. 2).

The recording medium 5 is, for example, a recording paper. Note however that the recording medium 5 is not limited to recording paper. In addition to papers such as plain papers and inkjet printing papers, the recording medium 5 includes those formed from a resin material such as polyvinyl chloride (PVC) and polyester, a metal plate formed from aluminum, iron, or the like, a glass plate, a wood plate, and cardboard, etc.

As described below, the printer 10 includes a platen 16 on which the recording medium 5 is placed, and an ink head 35 located directly above the platen 16. In the present specification, when printing on the recording medium 5 on the platen 16, the direction in which the recording medium 5 is conveyed on the platen 16 is the forward direction, and the opposite direction is the rearward direction. Left, right, up and down refer to those directions as seen from the operator in front of the printer 10. Note that when the operator is facing the front of the printer 10, the direction from the rear of the printer 10 toward the operator is forward, and the direction from the operator toward the rear of the printer 10 is rearward. The reference signs F, Rr, L, R, U and D in the drawings refer to front, rear, left, right, up and down, respectively.

A carriage 30 (see FIG. 2) to be described below is movable leftward and rightward. The carriage 30 is movable in the left-right direction. Where the rear side of the printer 10 is referred to as the upstream side and the front side of the printer 10 as the downstream side, the recording medium 5 is conveyed from the upstream side to the downstream side. The front side corresponds to the downstream side in the conveyance direction of the recording medium 5. The rear side corresponds to the upstream side in the conveyance direction of the recording medium 5. In the present preferred embodiment, the direction of movement of the carriage 30 is referred to as the primary scanning direction Y, and the direction of conveyance of the recording medium 5 is referred to as the sub-scanning direction X. Here, the primary scanning direction Y corresponds to the left-right direction, and the sub-scanning direction X corresponds to the front-back direction. The primary scanning direction Y and the sub-scanning direction X are orthogonal to each other. Note however that there is no particular limitation on the primary scanning direction Y and the sub-scanning direction X, and they can be set appropriately depending on the form of the printer 10, etc.

As shown in FIG. 1, the printer 10 includes a main body portion 10*a*, legs 11, an control panel 12, and a front cover 13. The main body portion 10*a* includes a casing extending in the primary scanning direction Y. The legs 11 are for supporting the main body portion 10*a*, and are provided on the bottom surface of the main body portion 10*a*. The control panel 12 is provided, for example, on the front surface on the right side of the main body portion 10*a*. Note however that there is no particular limitation on the position of the control panel 12. The control panel 12 is used by the user to perform print-related operations. The front cover 13 is provided pivotally on the main body portion 10*a*. As shown in FIG. 3, the front cover 13 is arranged forward relative to the carriage 30. The front cover 13 is formed, for example, of a transparent acrylic resin. Note that the front cover 13 is not shown in FIG. 2.

As shown in FIG. 3, the printer 10 includes the platen 16. The recording medium 5 is placed on the platen 16. Printing on the recording medium 5 is performed on the platen 16. The platen 16 extends in the primary scanning direction Y. The upper surface 16A of the platen 16 is flat.

The printer 10 includes an upstream guide 17 and a downstream guide 18 and an auxiliary guide 15. The upstream guide 17 guides the movement of the recording medium 5 onto the platen 16.

The downstream guide 18 is arranged forward relative to the platen 16. An upper wall 18A of the downstream guide 18 extends forward and downward from the rear side. The upper wall 18A of the downstream guide 18 includes an arc-shaped cross section, for example. The upper wall 18A of the downstream guide 18 is curved downward as it moves away from the platen 16. The downstream guide 18 guides the movement of the recording medium 5. That is, the downstream guide 18 guides the movement of the recording medium 5 from the platen 16.

The auxiliary guide 15 is arranged forward and downward relative to the downstream guide 18. An upper wall 15A of the auxiliary guide 15 extends rearward and forward. While the upper wall 15A of the auxiliary guide 15 may include an arc-shaped cross section, in this example it includes a straight cross section. The auxiliary guide 15 guides the movement of the recording medium 5. Here, the downstream guide 18 and the auxiliary guide 15 guide the recording medium 5 to a take-up device 19 (see FIG. 1) to take up the recording medium 5 placed on the platen 16. The downstream guide 18 and the auxiliary guide 15 are examples of a guide 14.

Figure 2:
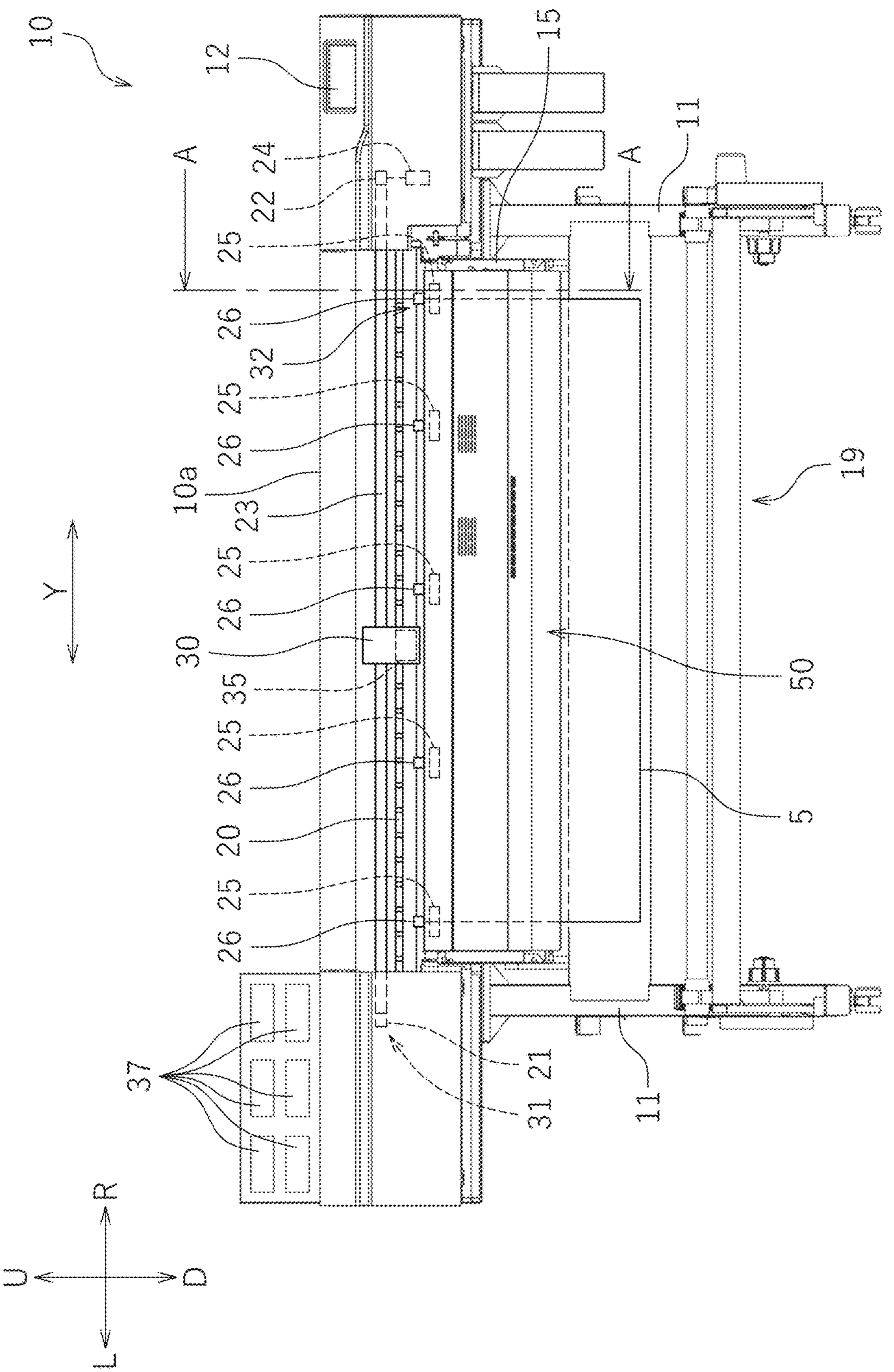
FIG. 2 is a front view of the printer according to the first preferred embodiment of the present invention.
Figure 3:
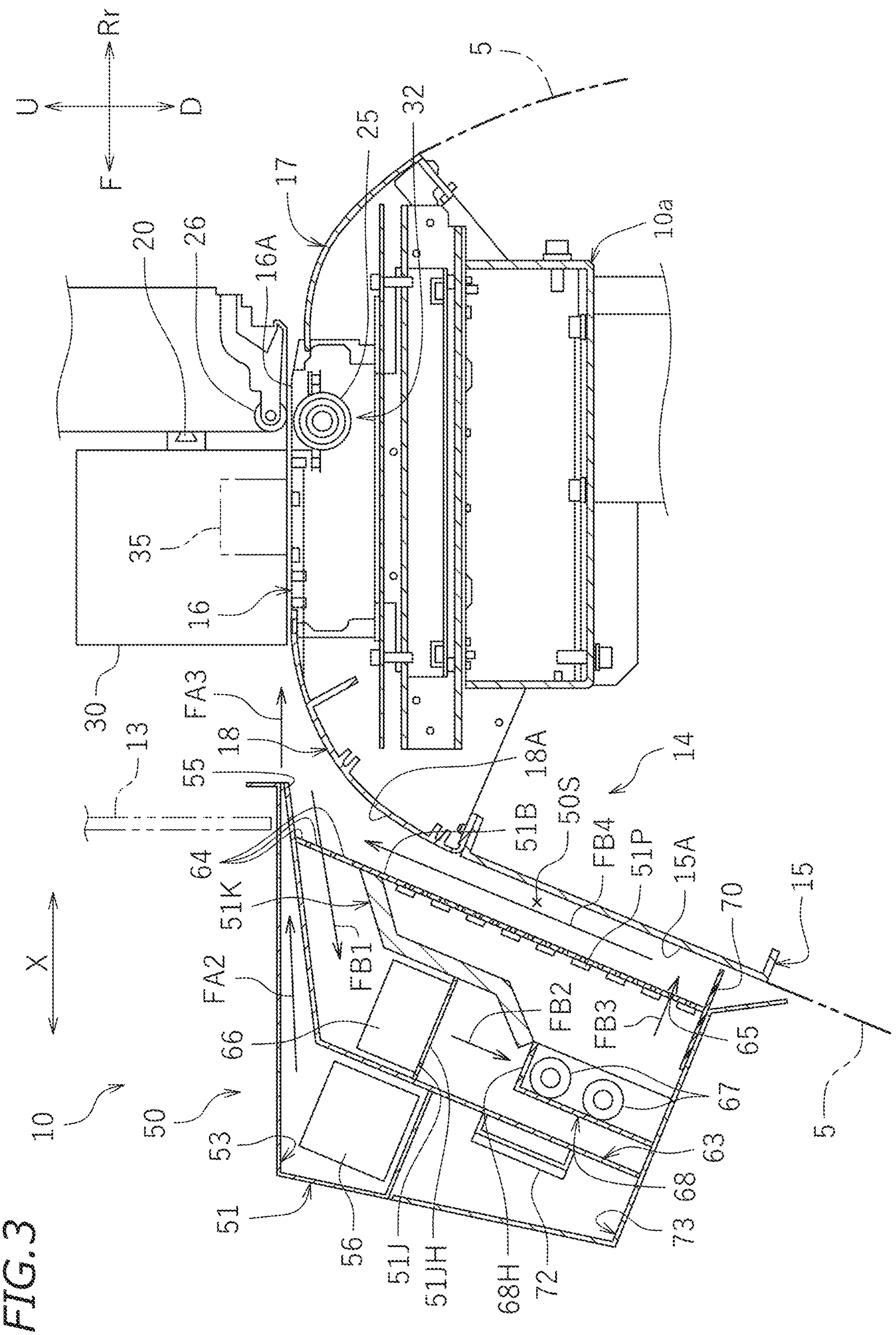
FIG. 3 is a cross-sectional view taken along line A-A of FIG. 2.

As shown in FIG. 2, the printer 10 includes an ink head 35 that dispenses ink. The ink head 35 dispenses water-based ink onto the recording medium 5. The ink head 35 is arranged upward relative to the platen 16. The ink head 35 is movable in the primary scanning direction Y. In the present preferred embodiment, the ink head 35 is connected to the ink cartridge 37 by an ink supply channel not shown.

For example, latex ink can be preferably used as water-based ink. A latex ink includes a solvent, a colorant and a binder resin. In a latex ink, the binder resin is dispersed or emulsified in a solvent. For example, one or more of water and water-soluble organic solvents (lower alcohols, lower ketones, etc.) that can be uniformly mixed with water can be selected and used as the solvent. A latex ink includes about 50% by mass or more and about 90% by mass or less of a solvent relative to the total mass of the latex ink, for example. As a colorant, any conventional colorant contained in a latex ink can be selected as appropriate. Example colorants include dyes such as water-soluble dyes, pigments, etc. Any conventional binder resin contained in a latex ink can be selected as appropriate as the binder resin.

As shown in FIG. 2, the printer 10 includes a head moving mechanism 31. The head moving mechanism 31 is a mechanism that moves the ink head 35 in the primary scanning direction Y relative to the recording medium 5 placed on the platen 16. In the present preferred embodiment, the head moving mechanism 31 moves the ink head 35 in the primary scanning direction Y. Here, the head moving mechanism 31 includes a guide rail 20, a first pulley 21, a second pulley 22, an endless belt 23, a first drive motor 24, and the carriage 30. The guide rail 20 guides the movement of the carriage 30 in the primary scanning direction Y. As shown in FIG. 3, the guide rail 20 is arranged upward of the platen 16. As shown in FIG. 2, the guide rail 20 extends in the primary scanning direction Y. The first pulley 21 is provided at the left end portion of the guide rail 20. The second pulley 22 is provided at the right end portion of the guide rail 20. The belt 23 is wound around the first pulley 21 and the second pulley 22. In the present preferred embodiment, the first drive motor 24 is connected to the second pulley 22. Note however that the first drive motor 24 may be connected to the first pulley 21. The first drive motor 24 drives and rotates the second pulley 22, thus causing the belt 23 to run between the first pulley 21 and the second pulley 22.

As shown in FIG. 2, the carriage 30 is attached to the belt 23. The carriage 30 is arranged upward relative to the platen 16. As shown in FIG. 3, the carriage 30 is in engagement with the guide rail 20 and is provided slidably against the guide rail 20. The ink head 35 is provided on the carriage 30. In the present preferred embodiment, the head moving mechanism 31 moves the ink head 35 provided on the carriage 30 in the primary scanning direction Y as the belt 23 is driven to run by the first drive motor 24 and the carriage 30 moves in the primary scanning direction Y.

The printer 10 includes a medium conveying mechanism 32. The medium conveying mechanism 32 relatively moves, in the sub-scanning direction X, the recording medium 5 placed on the platen 16 relative to the ink head 35. Here, the medium conveying mechanism 32 moves the recording medium 5 placed on the platen 16 in the sub-scanning direction X. Note that there is no particular limitation on the configuration of the medium conveying mechanism 32. As shown in FIG. 3, in the present preferred embodiment, the medium conveying mechanism 32 includes grit rollers 25, pinch rollers 26, and a second drive motor (not shown) that drives the grit rollers 25. The grit rollers 25 are provided on the platen 16. Here, at least a portion of the grit rollers 25 is buried in the platen 16. The pinch rollers 26 are provided to press the recording medium 5 from above. The pinch rollers 26 are arranged upward of the grit rollers 25. The pinch rollers 26 are provided at positions opposing the grit rollers 25. The pinch rollers 26 are movable in the up-down direction. When the grit rollers 25 are driven to rotate by the second drive motor, with the recording medium 5 sandwiched between the grit rollers 25 and the pinch rollers 26, the recording medium 5 is conveyed in the sub-scanning direction X. Note that there is no particular limitation on the positions and the numbers of grit rollers 25 and pinch rollers 26.

As shown in FIG. 1, the printer 10 includes a dryer 50. The dryer 50 is operable to dry ink that has been dispensed onto the recording medium 5. The dryer 50 sends an airflow toward the recording medium 5 placed on the platen 16. Also, the dryer 50 sends an airflow toward the recording medium 5 guided by the guide 14 (i.e., the downstream guide 18 and the auxiliary guide 15). Hereinafter, initial drying refers to drying the ink to the extent that pictures and characters can be formed by sending an airflow to the recording medium 5 placed on the platen 16. Complete drying refers to drying the ink to the extent that an airflow is sent to the recording medium 5 guided by the guide 14 to prevent back migration and blocking, in which the ink dries while the back migration has occurred so that the paper sticks to the platen.

As shown in FIG. 3, the dryer 50 is arranged forward relative to the platen 16. The dryer 50 opposes the downstream guide 18 and the auxiliary guide 15. A portion of the dryer 50 overlaps with the downstream guide 18 as viewed from above. The dryer 50 overlaps with the auxiliary guide 15 as viewed from above. As shown in FIG. 2, a portion of the dryer 50 overlaps with the downstream guide 18 and the auxiliary guide 15 as viewed from above. The dryer 50 is removably provided on the main body portion 10*a*.

As shown in FIG. 3, the dryer 50 includes a main body case 51 (see also FIG. 1) extending in the primary scanning direction Y, a first fan 56 to provide initial drying, a second fan 66 to provide complete drying, and a heater 67. The dryer 50 includes a first intake port 54 (see FIG. 1) at the right end portion of a main body case 51, a first exhaust port 55 at the rear end portion of the main body case 51, second intake ports 64 at the rear portion of the main body case 51, and second exhaust ports 65 at the rear portion of the main body case 51.

Figure 4:
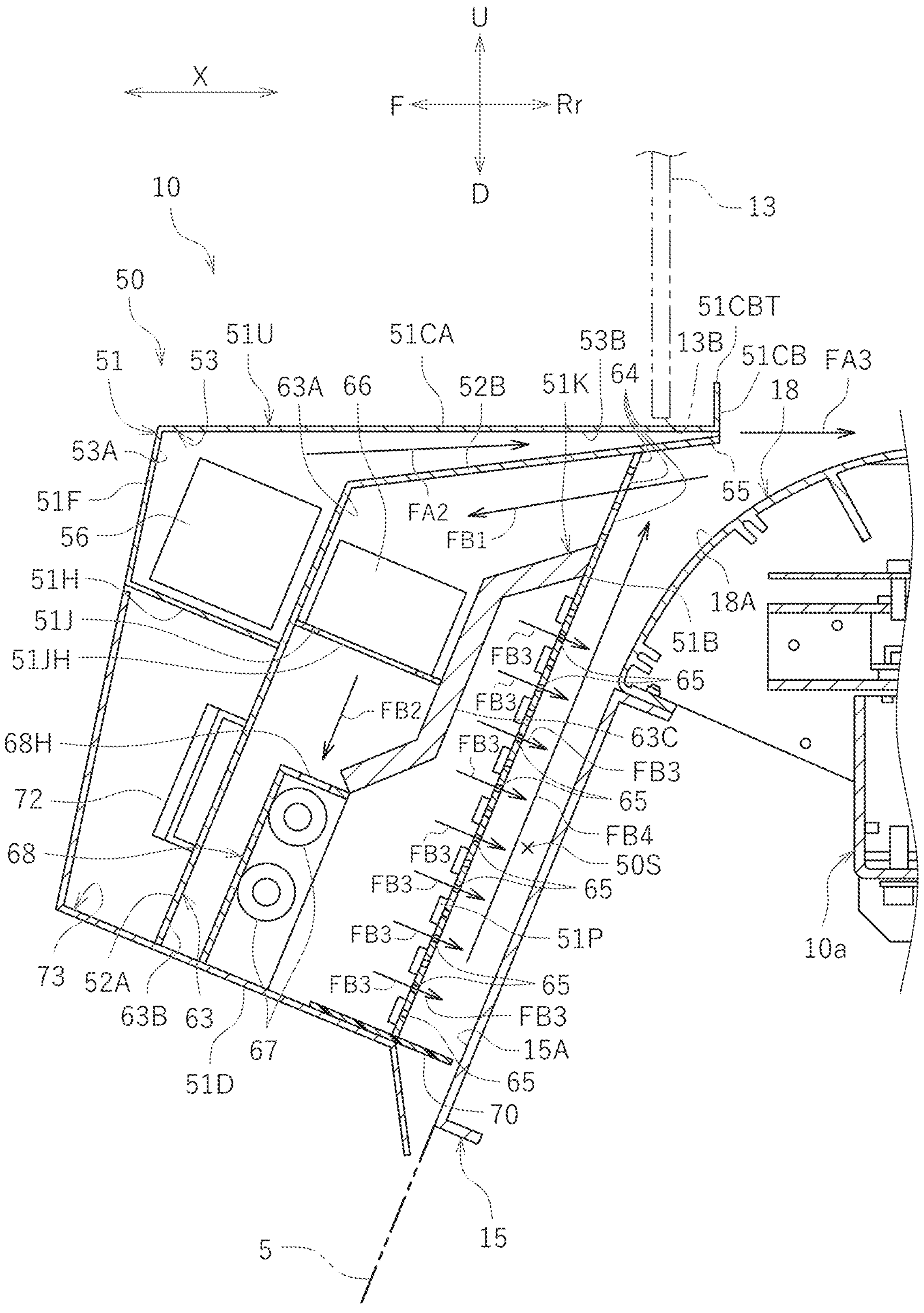
FIG. 4 is a cross-sectional view of a dryer according to the first preferred embodiment of the present invention.

As shown in FIG. 4, the main body case 51 includes a front wall 51F extending upward, an upper wall 51U extending rearward from the front wall 51F, a lower wall 51D extending rearward from the front wall 51F, and a rear wall 51B extending upward from the lower wall 51D. Also, the main body case 51 includes a left wall 51L (see FIG. 6) and a right wall 51R (see FIG. 1) arranged leftward and rightward, respectively, of the front wall 51F, the upper wall 51U, the lower wall 51D and the rear wall 51B. The front wall 51F, the upper wall 51U, the lower wall 51D, the rear wall 51B, the left wall 51L and the right wall 51R together define the outer wall of the main body case 51. At least one of the front wall 51F, the upper wall 51U, the lower wall 51D, the rear wall 51B, the left wall 51L and the right wall 51R may include multiple walls that are separate from each other. At least one of the front wall 51F, the upper wall 51U, the lower wall 51D, the rear wall 51B, the left wall 51L and the right wall 51R may be partially or entirely integrated with some or all of the other walls.

The dryer 50 includes a partition wall 52B that partitions the inside of the main body case 51 into a first chamber 53 and a second chamber 63, a partition wall 51H that partitions the inside of the main body case 51 into a first chamber 53 and a third chamber 73, and a partition wall 52A that partitions the inside of the main body case 51 into a second chamber 63 and a third chamber 73. At least one of the partition wall 52A, the partition wall 52B and the partition wall 51H may be partially or entirely integrated with some or all of the other partition walls. At least one of the partition wall 52A, the partition wall 52B and the partition wall 51H may be integrated with a portion of the outer wall of the main body case 51.

As shown in FIG. 4, the upper wall 51U includes a first portion 51CA extending in the horizontal direction, and a second portion 51CB located rearward relative to the front cover 13. An upper end 51CBT of the second portion 51CB is located upward relative to a lower end 13B of the front cover 13. The rear wall 51B is arranged at a position opposing the downstream guide 18 and the auxiliary guide 15.

As shown in FIG. 4, the partition wall 52B has a bent plate shape. The partition wall 52B includes a portion that is extended rearward and upward from the upper end of a partition wall 52A and a portion that extends rearward and upward from the upper end of the extended portion. The first chamber 53 includes a first exhaust channel 53B whose dimension in the up-down direction gradually decreases from the front side toward the rear side.

The thermal conductivity of the partition wall 52A and the partition wall 52B is lower than the thermal conductivity of the outer wall that partitions between the outside of the main body case 51 and the first chamber 53. The partition wall 52A and the partition wall 52B are formed from a material having a lower thermal conductivity than the upper portion of the front wall 51F and the upper wall 51U. The partition wall 52A and the partition wall 52B are formed from stainless steel, for example. The upper portion of the front wall 51F and the upper wall 51U are formed from iron, for example.

As shown in FIG. 4, the second chamber 63 is partitioned into an upper chamber 63A, a middle chamber 63B and a lower chamber 63C. The dryer 50 includes a first wall 51J and a second wall 51K that partition the second chamber 63 into an upper chamber 63A, a middle chamber 63B and a lower chamber 63C. The dryer 50 includes a heater holder 68 that holds a heater 67. The upper chamber 63A is partitioned by the rear wall 51B, the partition wall 52B, the first wall 51J and the second wall 51K. The middle chamber 63B is partitioned by the partition wall 52A, the first wall 51J, the second wall 51K, the heater holder 68 and the lower wall 51D. The lower chamber 63C is partitioned by the second wall 51K, the heater holder 68, the lower wall 51D and the rear wall 51B. The second fan 66 is attached to the first wall 51J. A connecting hole 51JH is formed in a portion of the first wall 51J that opposes the second fan 66. The connecting hole 51JH connects together the upper chamber 63A and the middle chamber 63B. A connecting hole 68H is formed in the heater holder 68. The connecting hole 68H connects the middle chamber 63B and the lower chamber 63C.

As shown in FIG. 1, the first intake port 54 is provided at the front and right end portion of the main body case 51. More specifically, the first intake port 54 is provided in the right wall 51R of the main body case 51. The first intake port 54 has an opening facing rightward. The first intake port 54 is not opposing the downstream guide 18 and the auxiliary guide 15. The first intake port 54 has a slit shape. The first intake port 54 communicates the outside of the main body case 51 and the first chamber 53. The first intake port 54 takes air from the outside into the first chamber 53. Note that the location of the first intake port 54 is not limited to the right end portion of the main body case 51. The first intake port 54 may be provided at the left end portion of the main body case 51, for example.

As shown in FIG. 4, the first exhaust port 55 to discharge air from the first chamber 53 is provided in the main body case 51. The first exhaust port 55 extends in the primary scanning direction Y and has an opening facing toward the platen 16. The first exhaust port 55 has a slit shape. The first exhaust port 55 has an opening facing rearward. The first exhaust port 55 is located upward relative to the upper surface 16A of the platen 16. The first exhaust port 55 is located upward relative to the first intake port 54. The first exhaust port 55 is located rearward relative to the second exhaust ports 65. The first exhaust port 55 communicates the first chamber 53 and the outside of the main body case 51.

Figure 6:
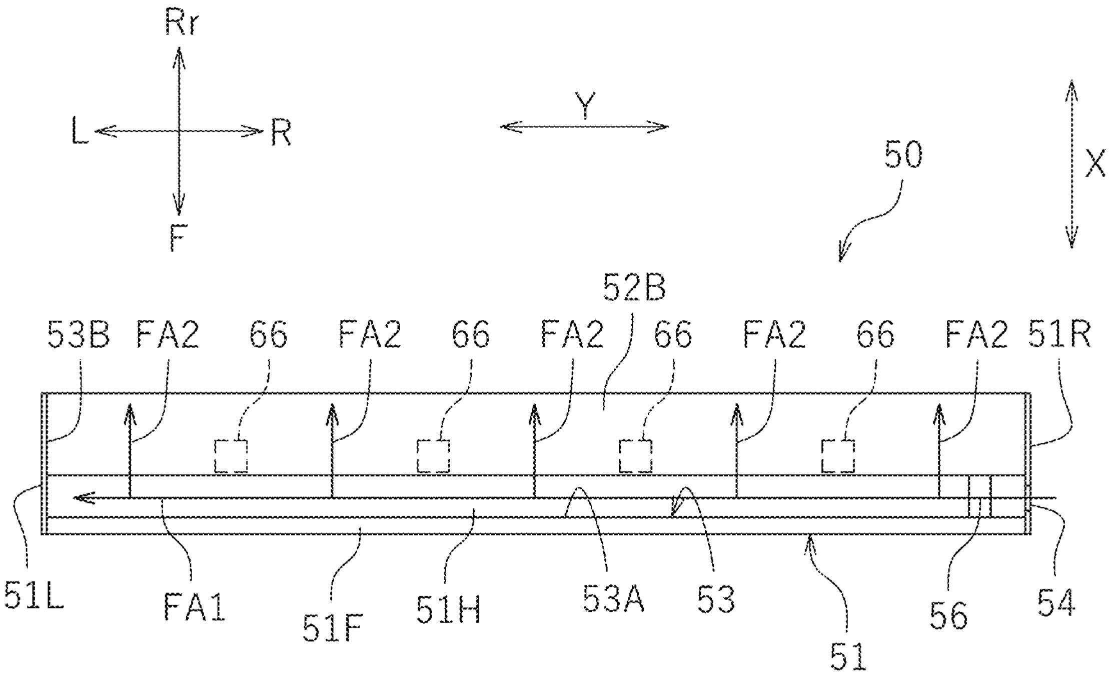
FIG. 6 is a plan view of the dryer according to the first preferred embodiment of the present invention.

As shown in FIG. 4, the first fan 56 is provided in the first chamber 53. As shown in FIG. 6, the dryer 50 includes one first fan 56. Note that the number of first fans 56 is not limited to one. The first fan 56 is arranged sideward of the first intake port 54. Here, the first fan 56 is arranged leftward of the first intake port 54. The first fan 56 draws air into the first chamber 53 through the first intake port 54, and discharges air from the first chamber 53 toward the platen 16 through the first exhaust port 55 (see FIG. 3).

Figure 7:
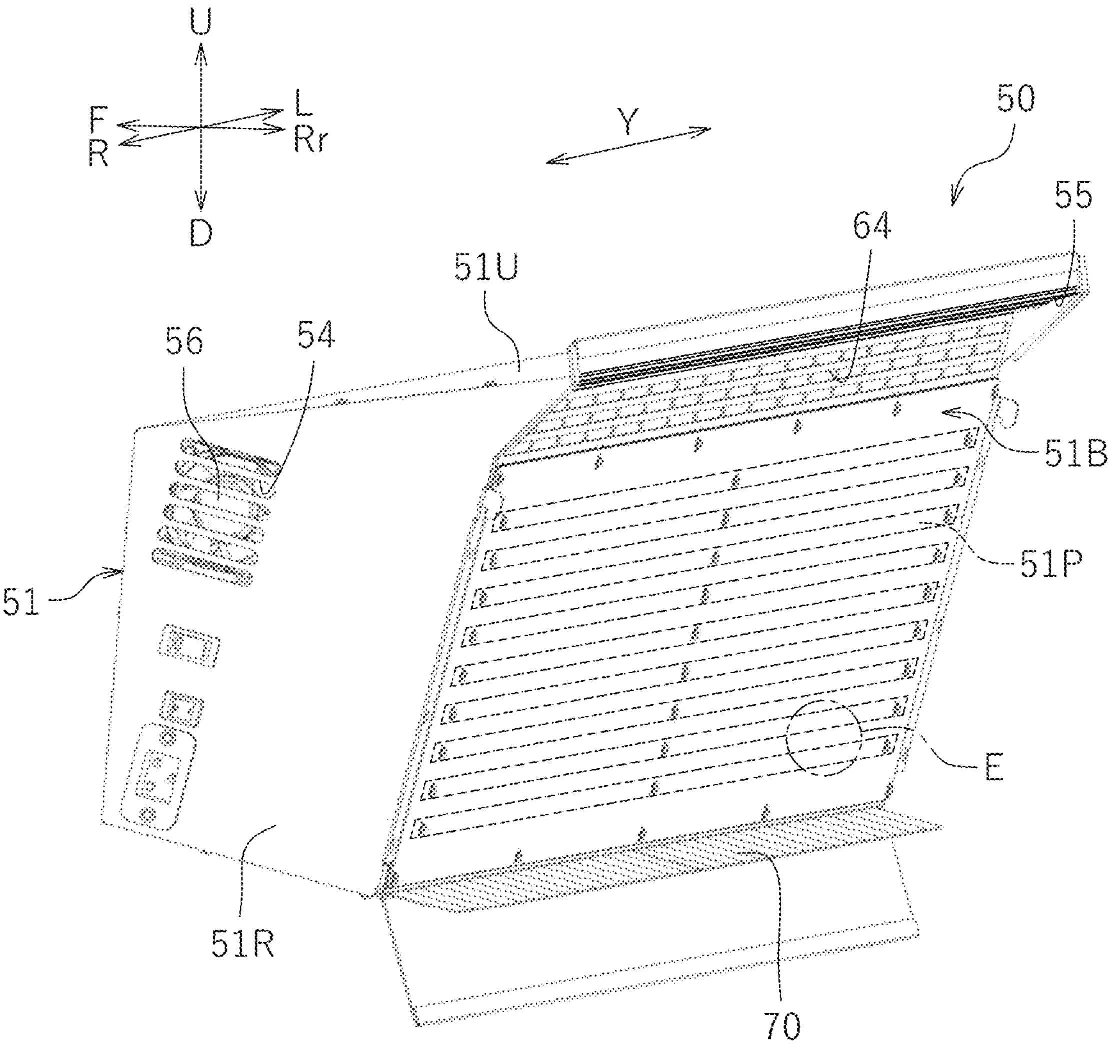
FIG. 7 is a perspective view of the dryer according to the first preferred embodiment of the present invention.

As shown in FIG. 7, the second intake ports 64 are provided at the rear portion of the main body case 51. More specifically, the second intake ports 64 are provided in the rear wall 51B of the main body case 51. As shown in FIG. 4, the second intake ports 64 have openings facing toward the downstream guide 18. In the present preferred embodiment, the second intake ports 64 include openings facing rearward and downward. The second intake ports 64 preferably have a rectangular or substantially rectangular shape. The second intake ports 64 connect together the outside of the main body case 51 and the second chamber 63. The second intake ports 64 take air from the outside into the second chamber 63. The second intake ports 64 are arranged downward relative to the first exhaust port 55. The second intake ports 64 are arranged forward relative to the first exhaust port 55.

Figure 5:
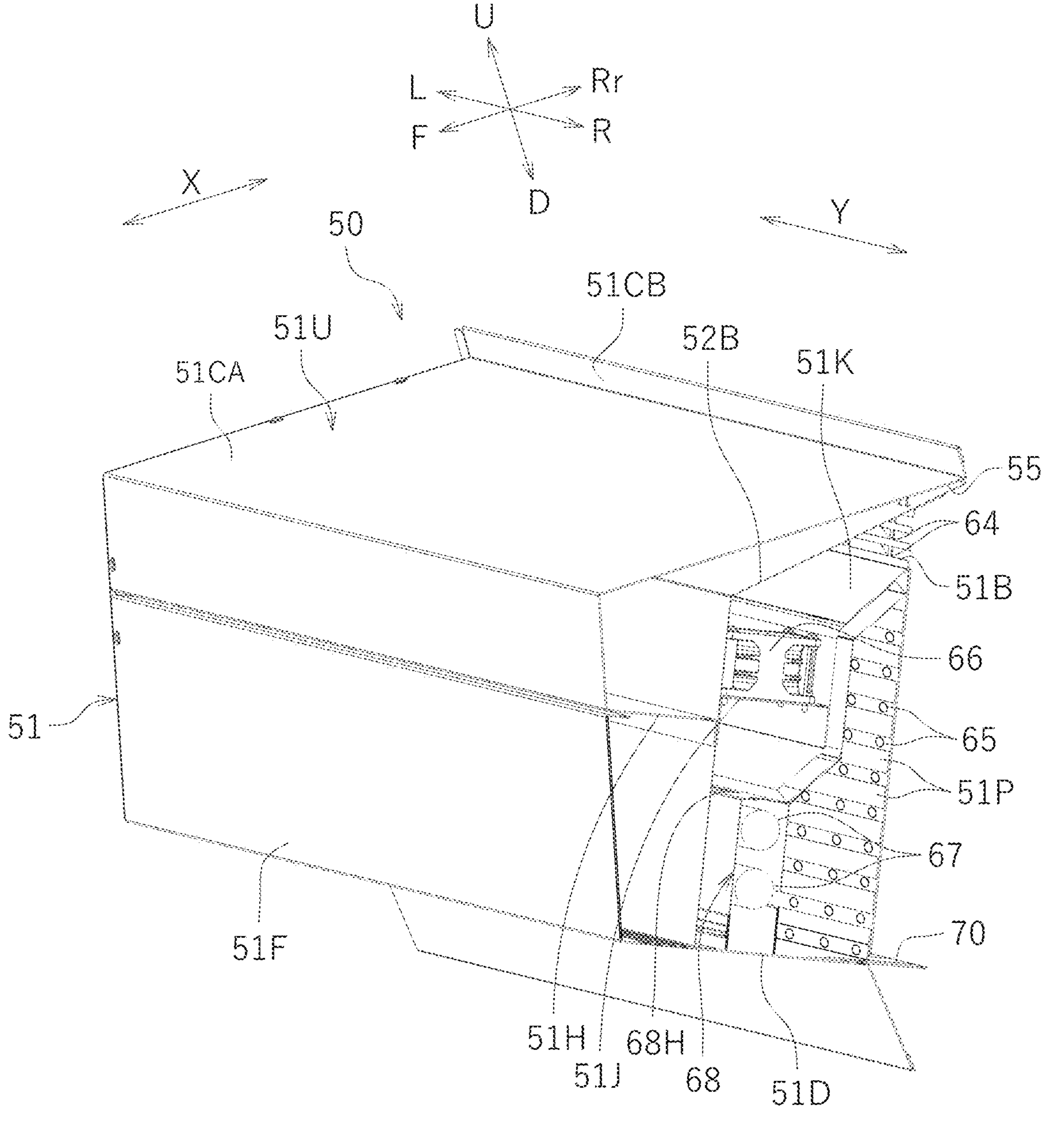
FIG. 5 is a cross-sectional perspective view the dryer according to the first preferred embodiment of the present invention.

As shown in FIG. 5, the second exhaust ports 65 are provided in the rear wall 51B. The rear wall 51B is formed by a perforated metal including a plurality of second exhaust ports 65. As shown in FIG. 4, the second exhaust ports 65 have openings facing toward the downstream guide 18 and the auxiliary guide 15. In the present preferred embodiment, the second exhaust ports 65 have openings facing rearward and downward. The second exhaust ports 65 have a circular shape (see FIG. 5). The second exhaust ports 65 connect together the second chamber 63 and the outside of the main body case 51. The second exhaust ports 65 are arranged downward relative to the first exhaust port 55. The second exhaust ports 65 are arranged downward relative to the second intake ports 64. The second exhaust ports 65 are arranged forward relative to the second intake ports 64. Note that the second exhaust ports 65 are not shown in FIG. 7.

Figure 8:
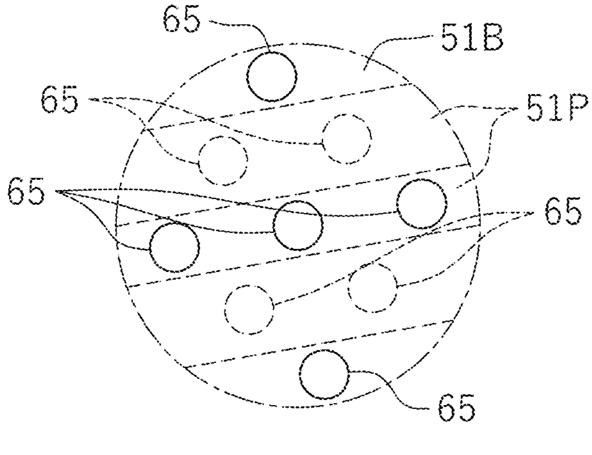
FIG. 8 is an enlarged view of portion E of FIG. 7.

The rear wall 51B is formed by a perforated metal having a plurality of openings 65. As shown in FIG. 5, the main body case 51 includes a plurality of rectifying plates 51P provided on the rear wall 51B so as to block some of the openings 65. Of the plurality of openings 65, openings not blocked by the rectifying plates 51P are the second exhaust ports 65. By blocking some of the openings 65, the rectifying plates 51P serve to increase the pressure in the upstream portion of the second exhaust ports 65 of the second chamber 63 and to make uniform the velocity distribution of the air through the second exhaust ports 65. Here, such a process of making uniform air velocity distribution is referred to as "rectification". The rectifying plates 51P are arranged in the second chamber 63. The rectifying plates 51P extend in the primary scanning direction Y. As shown in FIG. 8, the rectifying plates 51P are attached to the rear wall 51B so as to overlap with some openings 65.

As shown in FIG. 4, the second fan 66 is arranged in the second chamber 63. More specifically, the second fan 66 is arranged in the upper chamber 63A. The second fan 66 is located between the second intake ports 64 and the heater 67. As shown in FIG. 6, the dryer 50 includes four second fans 66. Note that the number of second fans 66 is not limited to four. The second fans 66 are arranged next to each other in the primary scanning direction Y. The second fans 66 are arranged leftward relative to the first fan 56. As shown in FIG. 4, the second fans 66 are configured to draw air through the second intake ports 64, pass the air through the heater 67, and then discharge the air through the second exhaust ports 65 toward the downstream guide 18 and the auxiliary guide 15. The flow rate of the second fans 66 is smaller than the flow rate of the first fan 56.

As shown in FIG. 4, the heater 67 is arranged in the second chamber 63. In the present preferred embodiment, two heaters 67 arranged next to each other in the up-down direction are arranged in the second chamber 63. The heaters 67 are held in the heater holder 68. The heaters 67 extend in the primary scanning direction Y. The heaters 67 heat the air sent from the second fan 66. The heaters 67 are sheath heaters, for example. In the present preferred embodiment, in order to prevent the heat of the air heated by the heater 67 from dissipating out of the second chamber 63, the lower wall 51D, the rear wall 51B, the right wall 51R, the left wall 51L, the partition wall 52A and the second wall 51K, which partition the second chamber 63, are formed from a material with relatively low thermal conductivity, for example, e.g., stainless steel.

As shown in FIG. 4, the main body case 51 includes a protruding plate 70 extending rearward and downward from the lower end portion of the main body case 51. The protruding plate 70 is held sandwiched between the rear wall 51B and the lower wall 51D of the main body case 51. The protruding plate 70 is located downward relative to the second exhaust ports 65. The distance between the protruding plate 70 and the auxiliary guide 15 is shorter than the distance between the rear wall 51B and the auxiliary guide 15. As shown in FIG. 7, the protruding plate 70 extends in the primary scanning direction Y. The protrusion plate 70 is formed from an elastically deformable material. For example, the protrusion plate 70 is made of rubber.

As shown in FIG. 3, the dryer 50 includes a printed circuit board 72 arranged in the third chamber 73. The printed circuit board 72 is connected to the first fan 56, the second fan 66 and the heater 67 via wires not shown. Note that at least one of the first fan 56, the second fan 66 and the heater 67 only needs to be connected to the printed circuit board 72.

Next, the air flow in the dryer 50 will be described in detail. First, the air flow in the first chamber 53 will be described. As indicated by arrow FA1 in FIG. 6, the first fan 56 draws air into the first chamber 53 through the first intake port 54 and lets the drawn air flow in the primary scanning direction Y. Next, the air in the first chamber 53 flows forward, as indicated by arrow FA2 in FIG. 6. The air flowing forward is rectified by the first exhaust channel 53B and discharged through the first exhaust port 55 toward the platen 16, as indicated by arrow FA3 in FIG. 3. Here, the first exhaust port 55 has a slit shape extending in the primary scanning direction Y, so that air can be sent over the entire extent of the platen 16 in the primary scanning direction Y.

Next, the air flow in the second chamber 63 will be described. As shown by arrow FB1 in FIG. 4, the second fan 66 draws air through the second intake ports 64 and lets the drawn air flow from the upper chamber 63A to the middle chamber 63B. The air sent from the second fan 66 flows into the middle chamber 63B through the connecting hole 51JH in the first wall 51J. The air flowing in the middle chamber 63B passes around the heater 67 after passing through the connecting hole 68H of the heater holder 68, as indicated by arrow FB2 in FIG. 4. The air heated by the heater 67 flows through the second exhaust ports 65 toward the recording medium 5 above the downstream guide 18 and the auxiliary guide 15, as indicated by arrow FB3 in FIG. 4.

The air blown onto the recording medium 5 guided by the downstream guide 18 and the auxiliary guide 15 flows upward as an updraft as indicated by arrow FB4 in FIG. 4, and flows into the second intake ports 64. Thus, the air heated by the heater 67 circulates in a space 50S enclosed by the downstream guide 18, the auxiliary guide 15 and the rear wall 51B and in the second chamber 63. That is, in the printer 10, a circulation path is provided in the space 50S and the second chamber 63, where air having a higher temperature than the air discharged through the first exhaust port 55 circulates. Note that the dryer 50 includes the protruding plate 70 located downward of the second exhaust ports 65, so that the air discharged through the second exhaust ports 65 is prevented from flowing downward and outward from the space 50S.

As described above, with the printer 10 of the present preferred embodiment, the dryer 50 can draw air from outside through the first intake port 54 by the first fan 56 and let the air flow into the first chamber 53. Then, the air flowing in the first chamber 53 is discharged toward the platen 16 through the first exhaust port 55. Air can be immediately sent toward water-based ink that has been dispensed from the ink head 35 and landed on the recording medium 5. Therefore, drying of the water-based ink is accelerated on the platen 16, and it is possible to improve the quality of the image formed on the recording medium 5. Note that in the present preferred embodiment, the first exhaust port 55 extends in the primary scanning direction Y. Therefore, it is possible to send a generally uniform airflow over a wide area of the recording medium 5 on the platen 16 in the primary scanning direction Y. Drying of the water-based ink on the platen 16 can be more accelerated.

Moreover, the dryer 50 can draw air from outside through the second intake ports 64 by the second fan 66 and let it flow into the second chamber 63. The air heated by the heater 67 is discharged through the second exhaust ports 65 toward the downstream guide 18 and the auxiliary guide 15. Thus, heated air can be sent further on the downstream guide 18 and the auxiliary guide 15 to the water-based ink that has been dried on the platen 16 by the air blown by the first fan 56. This can further accelerate the drying of the water-based ink dispensed onto the recording medium 5 on the downstream guide 18 and on the auxiliary guide 15.

With the printer 10 of the present preferred embodiment, the second exhaust ports 65 are arranged downward relative to the second intake ports 64. This allows the air heated by the heater 67 to be efficiently taken in again through the second intake ports 64. That is, heated air can be efficiently circulated in the second chamber 63 of the dryer 50 and on the downstream guide 18 and on the auxiliary guide 15.

With the printer 10 of the present preferred embodiment, the second intake ports 64 are arranged downward relative to the first exhaust port 55. This allows air to be more reliably sent to the platen 16 through the first exhaust port 55.

With the printer 10 of the present preferred embodiment, the thermal conductivity of the partition wall 52B is lower than the thermal conductivity of the front wall 51F and the upper wall 51U that partition between the inside and the outside of the first chamber 53. This prevents heat from the heater 67 from being transferred to the first chamber 53 via the partition wall 52B. The air can be heated to the required temperature in the second chamber 63 while keeping the output of the heater 67 low. Although the first chamber 53 is located closer to the operator operating the printer 10 and may be touched by the operator, it is safe because the heat from the heater 67 is not substantially transferred to the first chamber 53.

With the printer 10 of the present preferred embodiment, the dryer 50 includes the printed circuit board 72 arranged in the third chamber 73 and connected to at least one of the first fan 56, the second fan 66 and the heater 67. Heat from the heater 67 is prevented from being transferred to the third chamber 73 via the partition wall 52A, thus preventing heat-derived defects from occurring in the printed circuit board 72.

With the printer 10 of the present preferred embodiment, the dimension in the up-down direction of the first exhaust channel 53B of the first chamber 53 gradually decreases rearward. This allows a rectified airflow to be sent to the platen 16 through the first exhaust port 55.

With the printer 10 of the present preferred embodiment, the rear wall 51B is provided with a plurality of second exhaust ports 65, so that heated air can be blown over the entire extent of the recording medium 5 guided on the downstream guide 18 and on the auxiliary guide 15. By partially blocking some of the openings 65 by the rectifying plates 51P, the air flowing toward the downstream guide 18 and the auxiliary guide 15 is rectified.

With the printer 10 of the present preferred embodiment, a circulation path, where air having a higher temperature than the air discharged through the first exhaust port 55 is circulated, is provided in the space 50S enclosed by the downstream guide 18 and the auxiliary guide 15 and the rear wall 51B of the main body case 51 and in the second chamber 63. Then, the air heated by the heater 67 can be circulated, thus reducing the power consumption of the heater 67.

With the printer 10 of the present preferred embodiment, the first intake port 54 is provided in the front portion of the main body case 51. Since the first intake port 54 is located away from the circulation path, air circulation in the circulation path is less likely to be inhibited.

With the printer 10 of the present preferred embodiment, the first exhaust port 55 is located rearward relative to the second exhaust ports 65. This allows an airflow to be more reliably sent to the platen 16 through the first exhaust port 55.

With the printer 10 of the present preferred embodiment, the second intake ports 64 are arranged downward relative to the first exhaust port 55. This makes the flow of an airflow from the first exhaust port 55 to the platen 16 less likely to be obstructed.

The first preferred embodiment has been described above. While the dryer 50 includes the partition wall 51H that partitions between the first chamber 53 and the third chamber 73 in the preferred embodiment described above, but the partition wall 51H may be absent. In this case, the printed circuit board 72 and the first fan 56 are arranged in the first chamber 53, so that the printed circuit board 72 can be cooled by the first fan 56.

Second Preferred Embodiment

Next, the printer 10 according to the second preferred embodiment will be described. In the following description, members and portions that are similar to or that correspond to the first preferred embodiment are denoted by like reference signs, and redundant description will be omitted or simplified.

Figure 9:
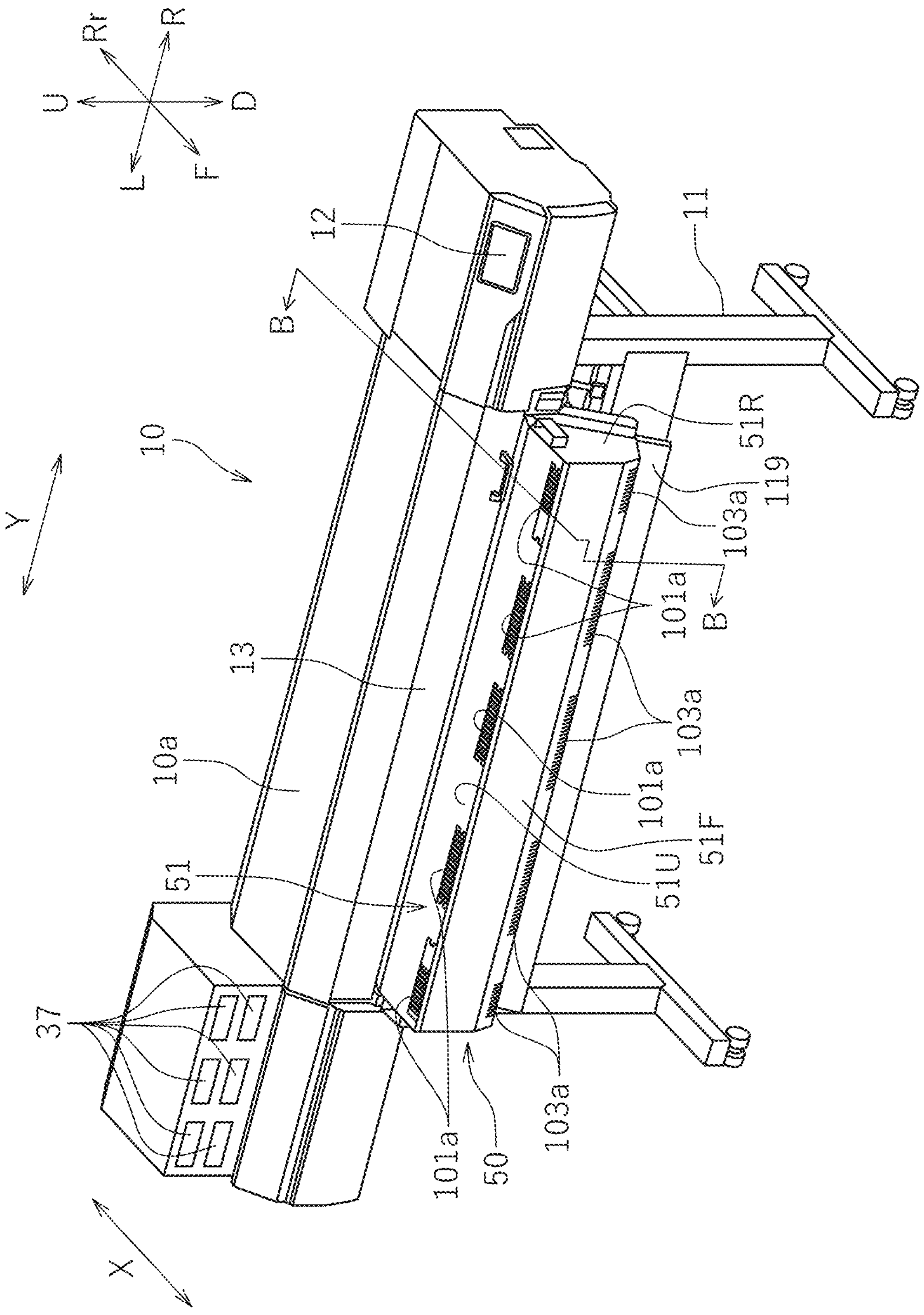
FIG. 9 is a perspective view of a printer according to the second preferred embodiment of the present invention.
Figure 10:
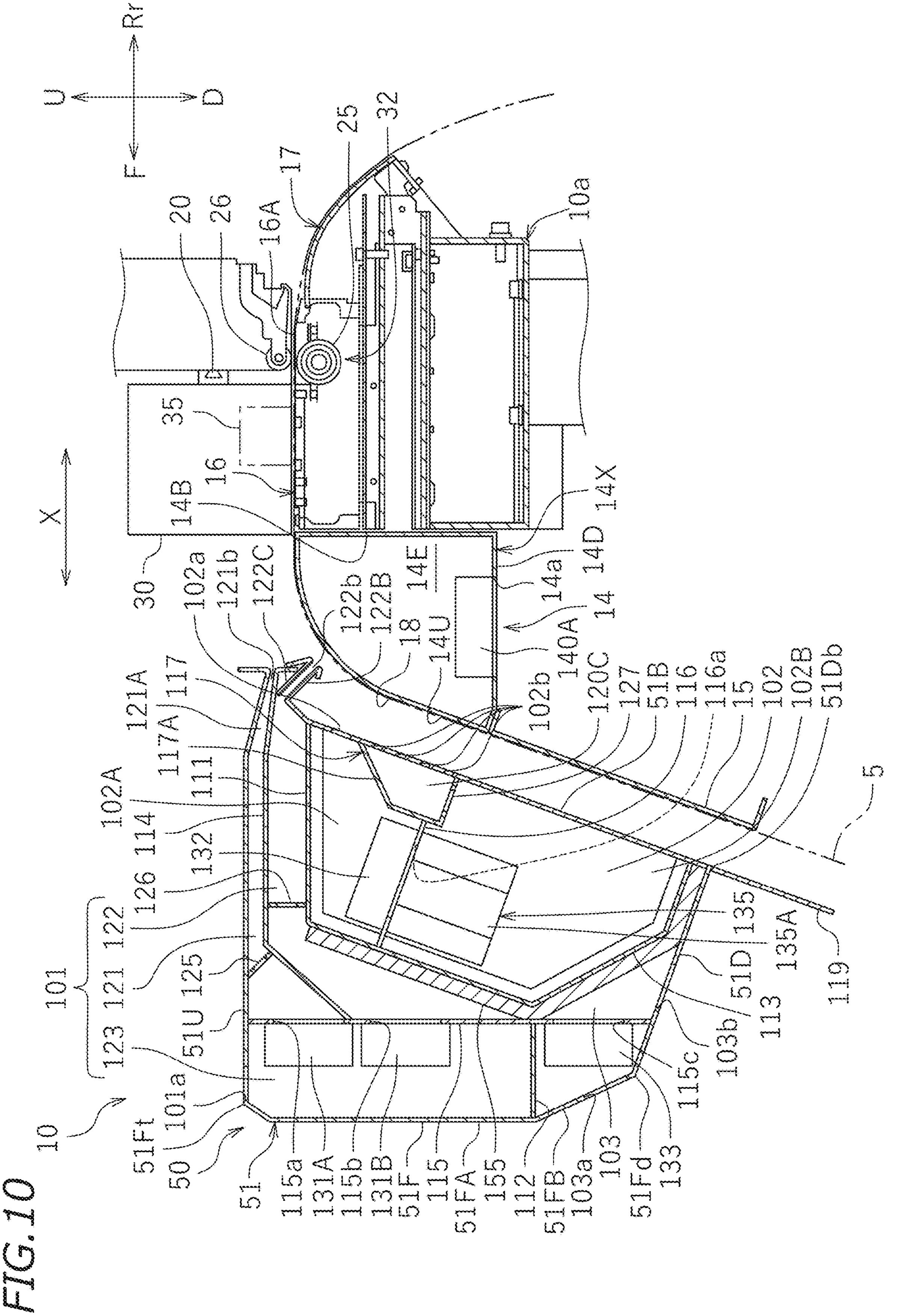
FIG. 10 is a cross-sectional view taken along line B-B of FIG. 9.

FIG. 9 is a perspective view of the printer 10 according to the second preferred embodiment. FIG. 10 is a cross-sectional view taken along line B-B of FIG. 9. As in the first preferred embodiment, the printer 10 according to the second preferred embodiment includes the platen 16 on which the recording medium 5 is placed, the carriage 30, the ink head 35, the guide 14 and the dryer 50. The carriage 30 is arranged upward relative to the platen 16, and is movable in the left-right direction, which is the primary scanning direction. The ink head 35 is provided on the carriage 30. The ink head 35 dispenses water-based ink onto the recording medium 5 conveyed forward on the platen 16. The guide 14 is arranged forward relative to the platen 16. The guide 14 includes an upper wall 14U that extends forward and downward on which the recording medium 5 is placed. The guide 14 guides the movement of the recording medium 5. In the present preferred embodiment, the guide 14 also includes the downstream guide 18 and the auxiliary guide 15, but there is no particular limitation thereto. The dryer 50 is arranged so as to oppose the upper wall 14U of the guide 14. The dryer 50 is configured to send an airflow toward the recording medium 5 on the guide 14.

In the second preferred embodiment, the configuration of the dryer 50 and the configuration of the guide 14 differ from the first preferred embodiment. First, the detailed configuration of the dryer 50 will be described.

As shown in FIG. 10, an air-passing chamber 101, a heated chamber 102 and an unheated chamber 103 are provided inside the dryer 50. The dryer 50 includes the main body case 51 extending in the left-right direction, a partition wall 111 that partitions the inside of the main body case 51 into the air-passing chamber 101 and the heated chamber 102, a partition wall 112 that partitions the inside of the main body case 51 into the air-passing chamber 101 and the unheated chamber 103, a partition wall 113 that partitions the inside of the main body case 51 into the heated chamber 102 and the unheated chamber 103. The dryer 50 also includes a partition wall 114 that partitions the inside of the air-passing chamber 101 into a first air-passing chamber 121 and a second air-passing chamber 122. The dryer 50 includes a partition wall 116 that partitions the inside of the heated chamber 102 into an upstream chamber 102A, where heated chamber fans 132 to be described below are arranged, and a downstream chamber 102B, and a partition wall 117 and a rectifying plate 127 that partition an exit chamber 102C from the downstream chamber 102B and the upstream chamber 102A in the heated chamber 102.

The heated chamber 102 is defined by the partition wall 111, the partition wall 113 and the rear wall 51B. The partition wall 111 and the partition wall 113 have a bent plate structure. The upstream chamber 102A is defined by the partition wall 111, the partition wall 116 and the partition wall 117. The downstream chamber 102B is defined by the partition wall 111, the partition wall 113, the partition wall

116, the rectifying plate 127 and the rear wall 51B. The exit chamber 102C is defined by the partition wall 117, the rectifying plate 127 and the rear wall 51B. The volume of the downstream chamber 102B is larger than the volume of the upstream chamber 102A, and the volume of the upstream chamber 102A is larger than the volume of the exit chamber 102C. The air flowing through the heated chamber 102 flows into the upstream chamber 102A from the heated chamber intake port 102*a*, is sent from the upstream chamber 102A to the downstream chamber 102B by the heated chamber fans 132 attached to the partition wall 116, flows into the exit chamber 102C from the downstream chamber 102B through through-holes 120*h* of the rectifying plate 127, and is discharged to the outside of the heated chamber 102 from the exit chamber 102C through a heated chamber exhaust port 102*b*. The pressure in the upstream chamber 102A is set to a negative pressure, the pressure in the downstream chamber 102B is set to a positive pressure, and the pressure in the exit chamber 120C is set to a positive pressure lower than the pressure in the downstream chamber 102B. As shown in FIG. 10, the rectifying plate 127 is arranged rearward relative to the heated chamber fans 132, and the through-holes 120*h* of the rectifying plate 127 are arranged to avoid positions that oppose the outlets of the heated chamber fans 132. The rectifying plate 127 is provided with a guide plate 117A that directs air flowing in the downstream chamber 120B to the heated chamber exhaust port 102*b*. Here, the guide plate 117A is defined by a portion of the partition wall 117. That is, a portion of the partition wall 117 serves also as the guide plate 117A. Note however that there is no limitation on the configuration of the guide plate 117A, and the guide plate 117A may be a separate structure from the partition wall 117.

The main body case 51 includes the front wall 51F extending upward, the upper wall 51U extending rearward from an upper end 51Ft of the front wall 51F, the lower wall 51D extending rearward from a lower end 51Fd of the front wall 51F, and the rear wall 51B extending upward from a rear end 51Db of the lower wall 51D. The lower wall 51D is arranged downward relative to the upper wall 51U, and the rear wall 51B is arranged rearward relative to the front wall 51F. The main body case 51 also includes the left wall 51L and the right wall 51R arranged leftward and rightward, respectively, of the front wall 51F, the upper wall 51U, the lower wall 51D and the rear wall 51B (see FIG. 11). Note that the front wall 51F, the upper wall 51U, the lower wall 51D, the rear wall 51B, the left wall 51L and the right wall 51R may be in a flat plate shape, or may be curved or bent. The front wall 51F, the upper wall 51U, the lower wall 51D, the rear wall 51B, the left wall 51L and the right wall 51R may be defined by a single structural element or may be defined by a combination of multiple structural elements. A portion or an entirety of at least one of the front wall 51F, the upper wall 51U, the lower wall 51D, the rear wall 51B, the left wall 51L and the right wall 51R may be integrated with a portion or whole of at least one other.

The dryer 50 includes an extension wall 119 extending downward from the lower wall 51D or the rear wall 51B. Here, the extension wall 119 is attached to the lower wall 51D. The extension wall 119 extends forward and downward from the lower end of the lower wall 51D. Note however that there is no particular limitation on the position of the extension wall 119. The extension wall 119 may be attached to the rear wall 51B. The extension wall 119 may extend forward and downward from the lower end of the rear wall 51B. The extension wall 119 may be absent.

Figure 11:
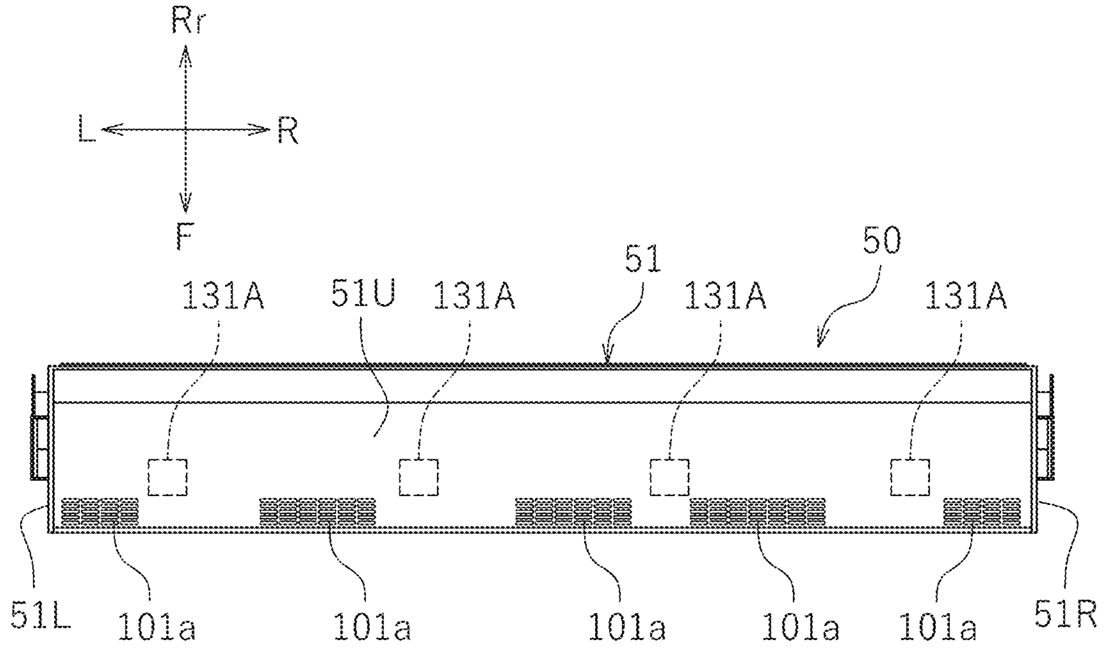
FIG. 11 is a front view of the dryer according to the second preferred embodiment of the present invention.

FIG. 11 is a plan view of the dryer 50. Air-passing chamber intake ports 101*a* are provided in the upper wall 51U of the main body case 51. The air-passing chamber intake ports 101*a* connect together the outside of the main body case 51 and the air-passing chamber 101. A plurality of air-passing chamber intake ports 101*a* are provided and arranged next to each other in the left-right direction.

Figure 12:
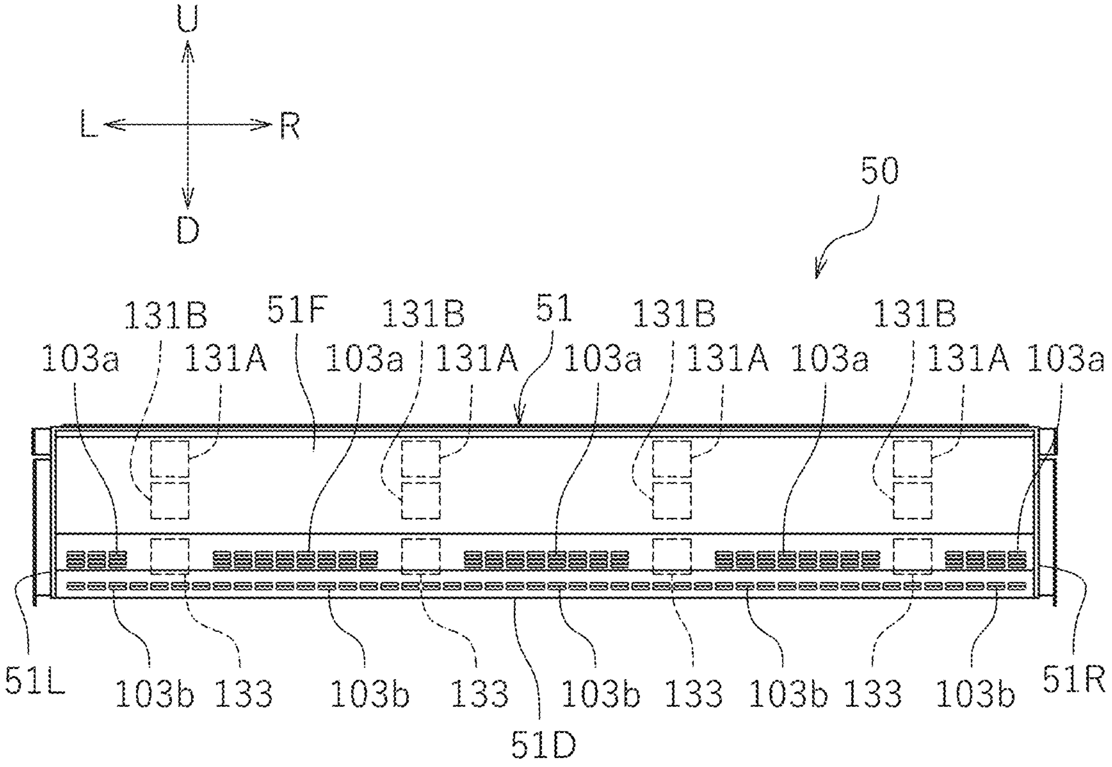
FIG. 12 is a plan view of the dryer according to the second preferred embodiment of the present invention.

FIG. 12 is a front view of the dryer 50. Unheated chamber intake ports 103*a* are provided in the front wall 51F of the main body case 51. As shown in FIG. 10, the front wall 51F includes a vertical wall 51FA and an inclined wall 51FB extending rearward and downward from the lower end of the vertical wall 51FA. In the present preferred embodiment, the unheated chamber intake ports 103*a* are provided in the inclined wall 51FB. The unheated chamber exhaust ports 103*b* are provided in the lower wall 51D of the main body case 51. In the present preferred embodiment, the lower wall 51D extends rearward and downward. Each of the unheated chamber intake ports 103*a* and the unheated chamber exhaust ports 103*b* communicates the outside of the main body case 51 and the unheated chamber 103. The unheated chamber intake ports 103*a* are positioned forward relative to the unheated chamber exhaust ports 103*b*. The unheated chamber exhaust ports 103*b* is formed through the inclined wall 51FB extending rearward and downward, and therefore have openings facing forward and downward.

Figure 13:
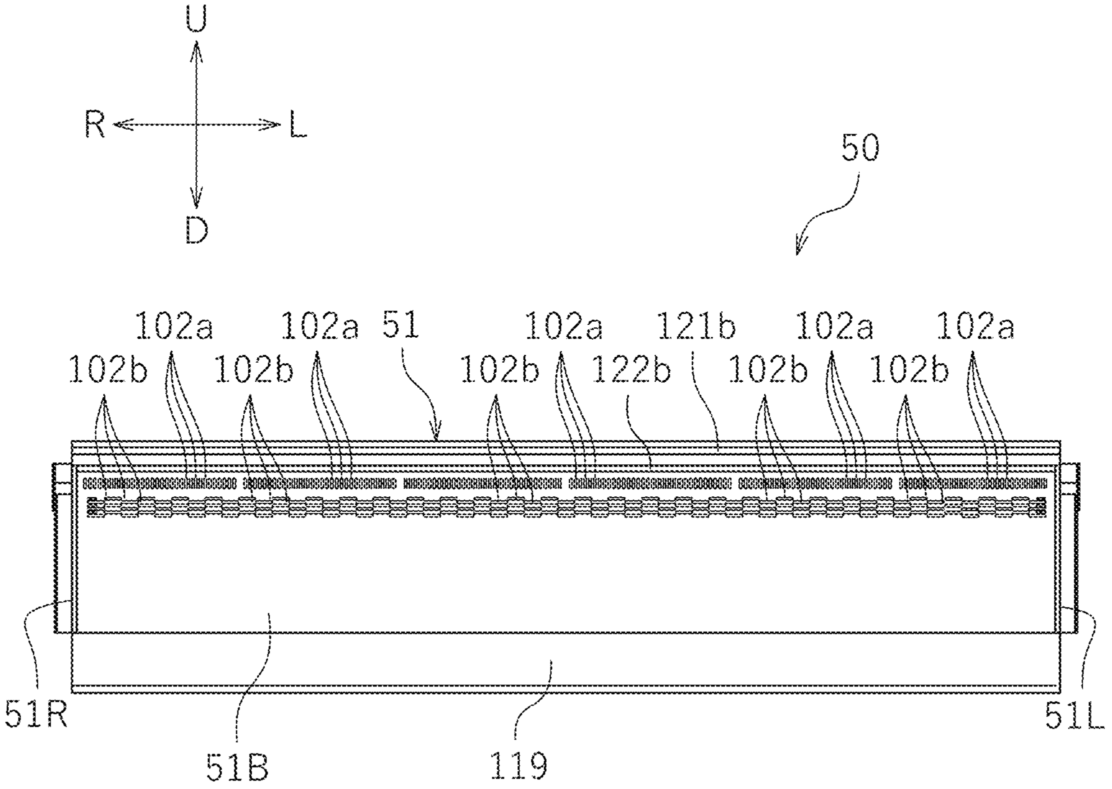
FIG. 13 is a rear view of the dryer according to the second preferred embodiment of the present invention.
Figure 14:
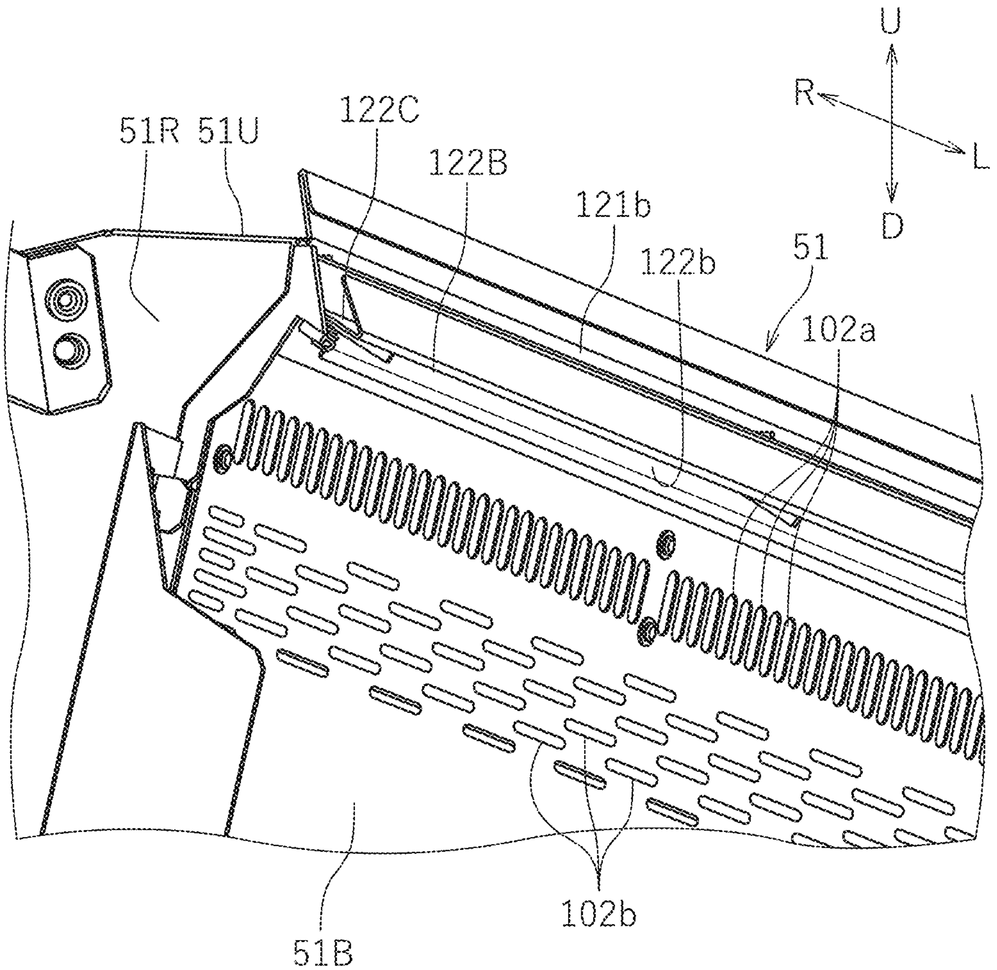
FIG. 14 is a partial perspective view of the dryer according to the second preferred embodiment of the present invention.

FIG. 13 is a rear view of the dryer 50. FIG. 14 is a perspective view showing a portion of the rear wall 51B of the main body case 51 on an enlarged scale. A first air-passing chamber exhaust port 121*b* and a second air-passing chamber exhaust port 122*b* are provided in the rear wall 51B. The first air-passing chamber exhaust port 121*b* communicates the first air-passing chamber 121 and the outside of the main body case 51. The second air-passing chamber exhaust port 122*b* communicates the second air-passing chamber 122 and the outside of the main body case 51. The first air-passing chamber exhaust port 121*b* and the second air-passing chamber exhaust port 122*b* have a slit shape, and extend in the left-right direction. The first air-passing chamber exhaust port 121*b* and the second air-passing chamber exhaust port 122*b* extend over the entire extent of the main body case 51 in the left-right direction. The second air-passing chamber exhaust port 122*b* is arranged downward relative to the first air-passing chamber exhaust port 121*b*.

As shown in FIG. 10, a discharge channel 121A whose width in the up-down direction gradually decreases rearward is provided in the first air-passing chamber 121. The first air-passing chamber exhaust port 121*b* is connected to the discharge channel 121A. The first air-passing chamber exhaust port 121*b* has an opening facing toward the platen 16. Here, the first air-passing chamber exhaust port 121*b* has an opening rearward along the horizontal direction.

The rear wall 51B includes blowout walls 122B and 122C extending rearward and downward. The blowout wall 122C is arranged upward of the blowout wall 122B, and a gap is located between the blowout wall 122B and the blowout wall 122C. This gap defines the second air-passing chamber exhaust port 122*b*. The second air-passing chamber exhaust port 122*b* has an opening facing rearward and downward toward the upper wall 14U of the guide 14.

As shown in FIG. 13, a plurality of heated chamber intake ports 102*a* and a plurality of heated chamber exhaust ports 102*b* are provided in the rear wall 51B. The heated chamber intake ports 102*a* connect together the outside of the main body case 51 to the upstream chamber 102A (see FIG. 10) of the heated chamber 102. The heated chamber exhaust ports 102*b* connect together the downstream chamber 102B of the heated chamber 102 and the outside of the main body case 51. Each of the heated chamber intake ports 102*a* and the heated chamber exhaust ports 102*b* is arranged next to each other in the left-right direction, and extend over the entire extent of the main body case 51 in the left-right direction. The heated chamber intake ports 102*a* are arranged downward relative to the second air-passing chamber exhaust port 122*b*. The heated chamber exhaust ports 102*b* are arranged downward relative to the heated chamber intake ports 102*a*. There is no particular limitation on the shape of the heated chamber intake ports 102*a* and the heated chamber exhaust ports 102*b*. Here, as shown in FIG. 14, each heated chamber intake port 102*a* has a slit shape elongated vertically, and each heated chamber exhaust port 102*b* has a slit shape elongated horizontally. As shown in FIG. 10, the heated chamber intake ports 102*a* and the heated chamber exhaust ports 102*b* have openings facing rearward and downward toward the guide 14. The first air-passing chamber exhaust port 121*b* and the second air-passing chamber exhaust port 122*b* are arranged rearward relative to the heated chamber exhaust port 102*b*.

Figure 15:
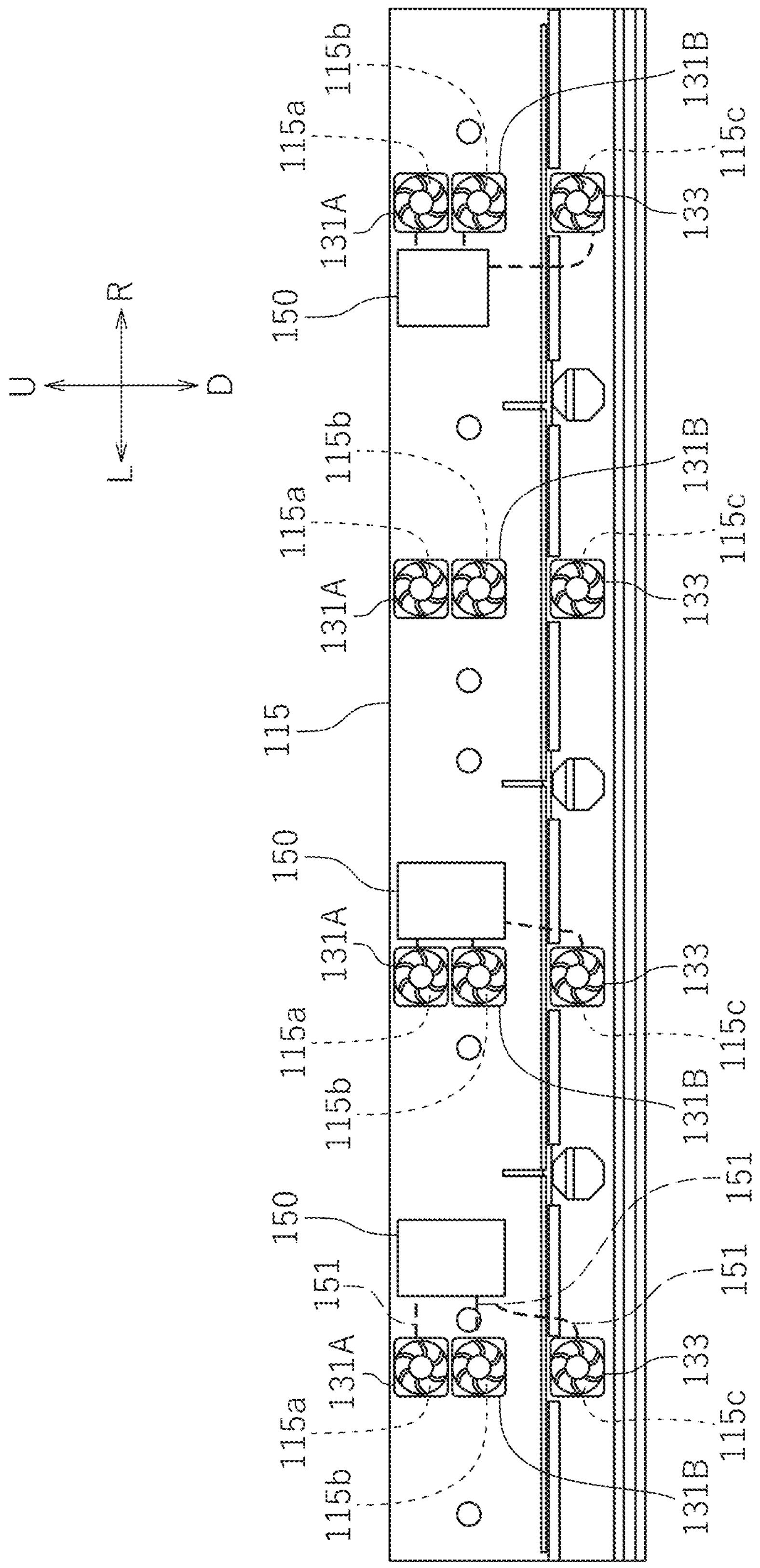
FIG. 15 is a front view of a mounting plate.

As shown in FIG. 10, the dryer 50 includes a mounting plate 115 at least partially arranged inside a main body case 10. A portion of the mounting plate 115 is arranged in the air-passing chamber 101 and another portion is arranged in the unheated chamber 103. A portion of the mounting plate 115 partitions the inside of the air-passing chamber 101 into an intake chamber 123 and the first air-passing chamber 121, and also partitions between the intake chamber 123 and the second air-passing chamber 122. As shown in FIG. 15, the mounting plate 115 has a flat plate shape extending in the left-right direction and the up-down direction. The mounting plate 115 has a plurality of first openings 115*a*, a plurality of second openings 115*b*, and a plurality of third openings 115*c*, each being arranged next to each other in the left-right direction. The first openings 115*a*, the second openings 115*b* and the third openings 115*c* are arranged next to each other in the up-down direction. Here, the second opening 115*b* is arranged directly below the first opening 115*a*. The third opening 115*c* is arranged directly below the second opening 115*b*. The first opening 115*a*, the second opening 115*b* and the third opening 115*c* have openings forward and rearward.

As shown in FIG. 10, the dryer 50 includes a plurality of first air-passing chamber fans 131A and a plurality of second air-passing chamber fans 131B provided in the air-passing chamber 101, a plurality of heated chamber fans 132 provided in the heated chamber 102, and a plurality of unheated chamber fans 133 provided in the unheated chamber 103. The first air-passing chamber fans 131A and the second air-passing chamber fans 131B are arranged in the intake chamber 123 of the air-passing chamber 101. The heated chamber fans 132 are arranged in the upstream chamber 102A of the heated chamber 102.

As shown in FIG. 15, the first air-passing chamber fans 131A, the second air-passing chamber fans 131B and the unheated chamber fans 133 are attached to the mounting plate 115. A plurality of first air-passing chamber fans 131A, a plurality of second air-passing chamber fans 131B and a plurality of unheated chamber fans 133 are each arranged next to each other in the left-right direction. The first air-passing chamber fans 131A, the second air-passing chamber fans 131B and the unheated chamber fans 133 are arranged next to each other along a straight line in the up-down direction. The second air-passing chamber fans 131B are arranged directly below the first air-passing chamber fans 131A, and the unheated chamber fans 133 are arranged directly below the second air-passing chamber fans 131B. The first air-passing chamber fans 131A, the second air-passing chamber fans 131B and the unheated chamber fans 133 are arranged parallel to each other so as to pass air rearward in the horizontal direction. In the present preferred embodiment, the first air-passing chamber fans 131A, the second air-passing chamber fans 131B and the unheated chamber fans 133 are axial flow fans.

The first openings 115*a* of the mounting plate 115 connect together the intake chamber 123 and the first air-passing chamber 121. The first air-passing chamber fans 131A are attached to the first openings 115*a* of the mounting plate 115. The first air-passing chamber fans 131A draw air into the intake chamber 123 through the air-passing chamber intake ports 101*a*, send the air from the intake chamber 123 to the first air-passing chamber 121 through the first openings 115*a*, and discharge the air from the second air-passing chamber 121 through the first air-passing chamber exhaust ports 121*b*. Thus, the first air-passing chamber fans 131A are configured to send air from the first air-passing chamber 121. The first air-passing chamber fan 131A is arranged to send air rearward in the horizontal direction.

The second openings 115*b* of the mounting plate 115 connect together the intake chamber 123 and the second air-passing chamber 122. The second air-passing chamber fans 131B are attached to the second openings 115*b* of the mounting plate 115. The second air-passing chamber fans 131B draw air into the intake chamber 123 through the air-passing chamber intake ports 101*a*, send the air from the intake chamber 123 to the second air-passing chamber 122 through the second openings 115*b*, and discharge the air from the second air-passing chamber 122 through the second air-passing chamber exhaust ports 122*b*. The second air-passing chamber fans 131B are configured to send air from the second air-passing chamber 122. The second air-passing chamber fans 131B are arranged to send air rearward in the horizontal direction.

The first air-passing chamber fans 131A and the second air-passing chamber fans 131B may be fans of the same specifications or may be fans of different specifications. The flow rate of the first air-passing chamber fans 131A and the second air-passing chamber fans 131B may be equal to each other or may be different from each other. Here, the first air-passing chamber fans 131A and the second air-passing chamber fans 131B are set so that the air-blowing speed through the second air-passing chamber exhaust ports 122*b* is greater than the air-blowing speed through the first air-passing chamber exhaust ports 121*b*.

While the first air-passing chamber fans 131A and the second air-passing chamber fans 131B may be arranged directly below the air-passing chamber intake ports 101*a*, they are arranged leftward or rightward of a location directly below the air-passing chamber intake ports 101*a* in the present preferred embodiment. The first air-passing chamber fans 131A and the second air-passing chamber fans 131B are arranged leftward and rightward relative to the air-passing chamber intake port 101*a* (see FIG. 11). Thus, even if a foreign object is sucked in through an air-passing chamber intake port 101*a*, the foreign object is likely to fall at a position that is shifted in the left-right direction from a first air-passing chamber fan 131A and a second air-passing chamber fan 131B, and it is possible to prevent the foreign object from getting caught in the first air-passing chamber fan 131A and the second air-passing chamber fan 131B. It is possible to prevent a failure due to a foreign object getting caught in the first air-passing chamber fans 131A and the second air-passing chamber fans 131B.

The unheated chamber fans 133 are attached to the third openings 115*c* of the mounting plate 115. The unheated chamber fans 133 draw air into the unheated chamber 103 through the unheated chamber intake ports 103*a*, send the air of the unheated chamber 103 from forward to rearward of the mounting plate 115 through the third openings 115*c*, and discharge the air through the unheated chamber exhaust ports 103*b*. The unheated chamber fans 133 are configured to send air from the unheated chamber 103. While the unheated chamber fans 133 may be arranged in a position that overlaps with the unheated chamber intake ports 103*a* as viewed from the front side, they are arranged in the present preferred embodiment at positions that are shifted from the unheated chamber intake ports 103*a*. The unheated chamber fans 133 are arranged leftward or rightward relative to the unheated chamber intake ports 103*a* (see FIG. 12 and FIG. 15). Thus, even if a foreign object is sucked in through the unheated chamber intake ports 103*a*, and foreign object is likely to fall at a position that is shifted from the unheated chamber fan 133 in the left-right direction, and it is possible to prevent a foreign object from getting caught in the unheated chamber fan 133 and it is possible to prevent the unheated chamber fan 133 from breaking down.

As shown in FIG. 10, the heated chamber fans 132 are mounted on the partition wall 116. Fourth openings 116*a* are provided in the partition wall 116. The fourth openings 116*a* connect together the upstream chamber 102A and the downstream chamber 102B of the heated chamber 102. The heated chamber fans 132 are attached to the fourth openings 116*a* of the partition wall 116. The heated chamber fans 132 draw air into the heated chamber 102 through the heated chamber intake ports 102*a*, send the air of the upstream chamber 102A to the downstream chamber 102B through the fourth openings 116*a*, and discharge the air of the downstream chamber 102B through the heated chamber exhaust ports 102*b*. The heated chamber fans 132 are configured to send the air of the heated chamber 102. In the present preferred embodiment, the heated chamber fans 132 are axial flow fans. Note that the total opening area of the heated chamber exhaust ports 102*b* may be smaller than the channel cross-sectional area of the heated chamber fans 132 so that the downstream side of the heated chamber fans 132 in the heated chamber 102 is a pressurized space.

The dryer 50 includes a heater 135 arranged in the heated chamber 102. The heater 135 heats the air sent by the heated chamber fans 132. There is no particular limitation on the configuration of the heater 135. Here, the heater 135 includes a cylinder 135A, having an octagonal cross section, and an electric heating wire, not shown, arranged inside the cylinder 135A. Air is heated by the electric heating wire as it passes through the inside of the cylinder 135A. The heated chamber 102 is configured to heat the air.

As shown in FIG. 15, the dryer 50 includes printed circuit boards 150 connected via wires 151 to the first air-passing chamber fans 131A, the second air-passing chamber fans 131B and the unheated chamber fans 133. The printed circuit boards 150 supply electricity to the first air-passing chamber fans 131A, the second air-passing chamber fans 131B and the unheated chamber fans 133. While the number of printed circuit boards 150 may be one, the dryer 50 in the present preferred embodiment includes a plurality of printed circuit boards 150 arranged next to each other in the left-right direction. The printed circuit boards 150 are attached to the mounting plate 115. That is, the printed circuit boards 150, the first air-passing chamber fans 131A, the second air-passing chamber fans 131B and the unheated chamber fans 133 are attached to a common mounting plate 115. It is preferred that the printed circuit boards 150 are arranged near the first air-passing chamber fans 131A, the second air-passing chamber fans 131B and the unheated chamber fans 133, so that it is possible to shorten the length of the wires 151 connecting the first air-passing chamber fans 131A, the second air-passing chamber fans 131B and the unheated chamber fans 133 to the printed circuit board 150. The printed circuit boards 150 are arranged in the intake chamber 123 of the air-passing chamber 101. An airflow is generated in the intake chamber 123 by the first air-passing chamber fans 131A and the second air-passing chamber fans 131B. The printed circuit boards 150 are cooled by the airflow. Note however that there is no particular limitation on the arrangement of the printed circuit boards 150. The printed circuit boards 150 may be arranged in the unheated chamber 103. In this case, the printed circuit boards 150 are cooled by the airflow formed by the unheated chamber fans 133.

In the present preferred embodiment, the partition wall 112 and the partition wall 114 are formed of iron. The partition wall 111 and the partition wall 113, which partition the heated chamber 102, are formed of stainless steel. The thermal conductivity of the partition wall 111 and the partition wall 113 is lower than the thermal conductivity of the partition wall 112 and the partition wall 114. In addition, in order to prevent the transfer of heat from the heated chamber 102 to the air-passing chamber 101 and the unheated chamber 103, an insulation material 155 is provided on the air-passing chamber 101 side of the partition wall 111 and the unheated chamber 103 side of the partition wall 113. In the present preferred embodiment, the insulation material 155 is flexible and easily deformable.

The mounting plate 115 is pressed against the insulation material 155 from the front side. The mounting plate 115 is pressed against the partition wall 111 and the partition wall 113 via the insulation material 155. The mounting plate 115 is positioned at a predetermined position by being pressed against the partition wall 111 and the partition wall 113. Since the insulation material 155 is interposed between the mounting plate 115 and the partition wall 111 and the partition wall 113, it is possible to prevent the printed circuit board 150, the first air-passing chamber fan 131A, the second air-passing chamber fan 131B and the unheated chamber fan 133 attached to the mounting plate 115 from being heated by the heat of the heated chamber 102.

Note however that there is no particular limitation on the material of the partition wall 111 and the partition wall 113. The insulation material 155 is not always necessary and can be omitted.

Figure 16:
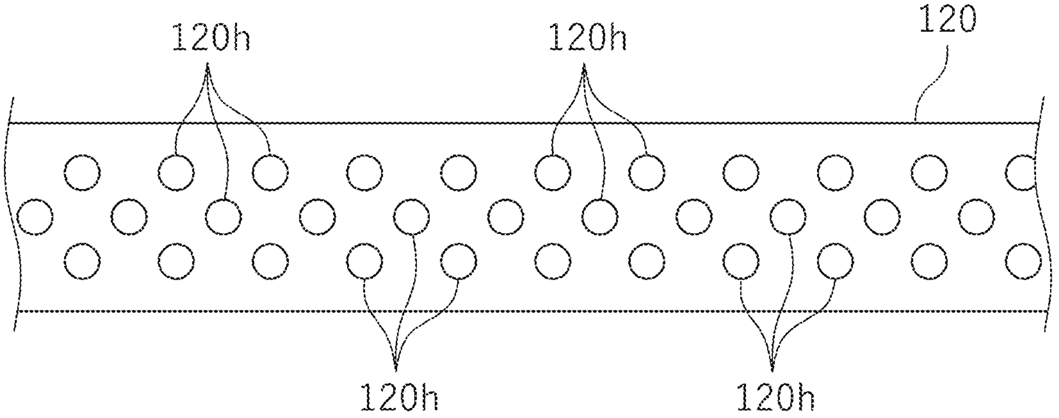
FIG. 16 is a front view of a rectifying plate.

While the first air-passing chamber 121 and the first air-passing chamber exhaust port 121*b* extend in the left-right direction, the first air-passing chamber fans 131A are dispersed in the left-right direction (see FIG. 15). Therefore, a rectifying member may be provided to make uniform the velocity distribution of air flowing through the first air-passing chamber 121. For example, as a rectifying member, a rectifying plate 120 with a plurality of through-holes 120*h* may be provided, as shown in FIG. 16. For example, a perforated metal can be suitably used as the rectifying plate 120. Here, as shown in FIG. 10, a first rectifying plate 125 including the rectifying plate 120 is arranged inside the first air-passing chamber 121. The first rectifying plate 125 extends in the left-right direction as the first air-passing chamber exhaust port 121*b* and extends over the entire extent of the main body case 51 in the left-right direction.

Similarly, while the second air-passing chamber 122 and the second air-passing chamber outlet 122*b* extend in the left-right direction, the second air-passing chamber fans 131B are arranged dispersed in the left-right direction. Therefore, a rectifying member may be provided to make uniform the velocity distribution of the air flowing through the second air-passing chamber 122. Here, a second rectifying plate 126 which is a rectifying plate 120 (see FIG. 16) is arranged inside the second air-passing chamber 122. The second rectifying plate 126 extends in the left-right direction as the second air-passing chamber exhaust port 122*b*, and extends over the entire extent of the main body case 51 in the left-right direction.

While the heated chamber 102 extends in the left-right direction, and the heated chamber exhaust port 102*b* is arranged over the entire extent in the left-right direction, the heated chamber fans 132 are arranged dispersed in the left-right direction. Therefore, a rectifying member may be provided to make uniform the velocity distribution of the air discharged through the heated chamber exhaust port 102*b*. Here, a third rectifying plate 127 made from a rectifying plate 120 (see FIG. 16) is arranged in the downstream chamber 102B of the heated chamber 102. The third rectifying plate 127 extends in the left-right direction, and extends over the entire extent of the main body case 51 in the left-right direction. In order to enhance the rectification effect, it is preferred that the third rectifying plate 127 is arranged at a position close to the heated chamber exhaust port 102*b*. Note however that there is no particular limitation on the position of the third rectifying plate 127. Although there is no particular limitation, the total opening area of the through-holes of the third rectifier plate 127 here is larger than the total opening area of the heated chamber exhaust port 102*b*.

Figure 17:
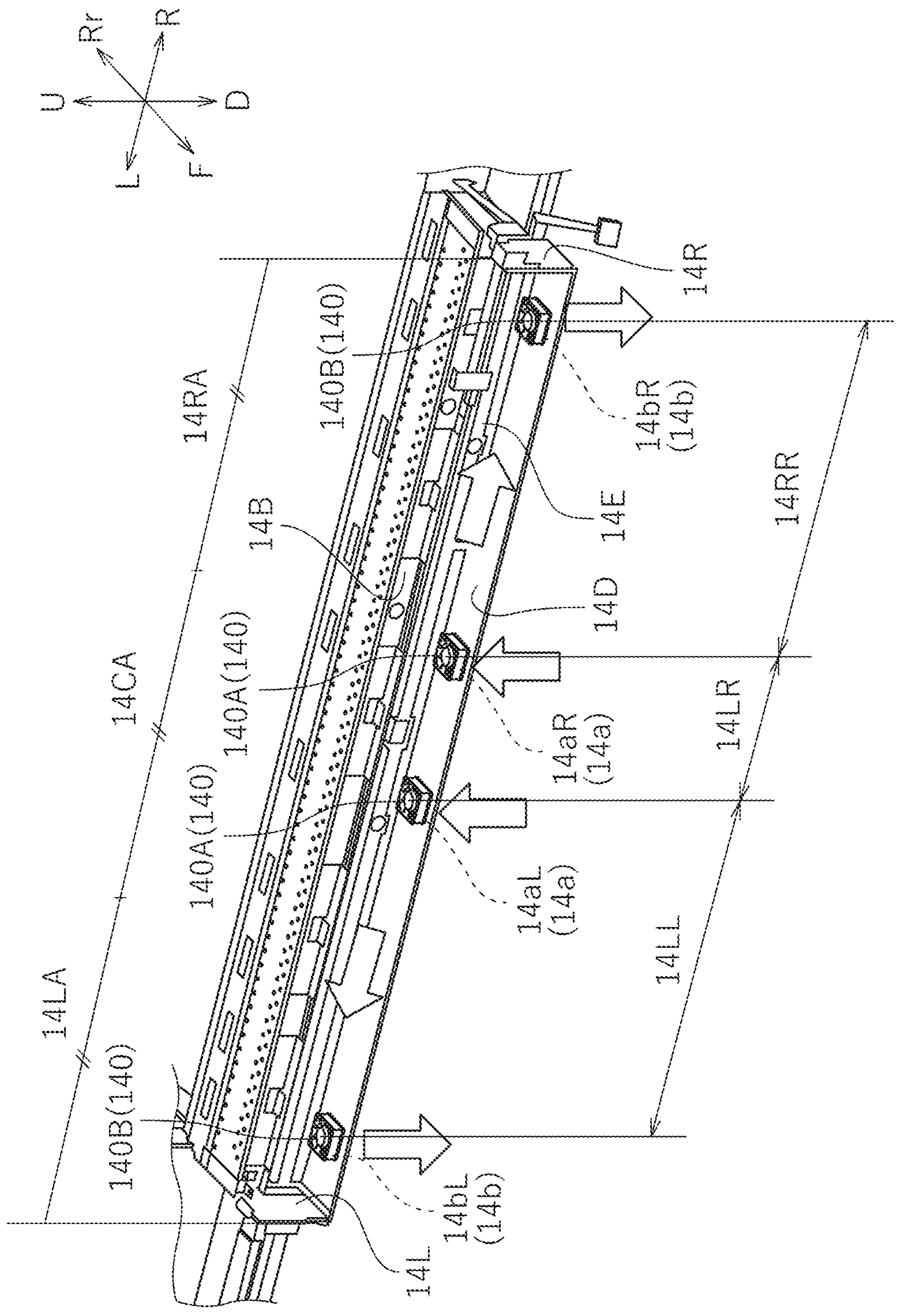
FIG. 17 is a perspective view showing a guide, partially removed, according to the second preferred embodiment of the present invention.

Next, the guide 14 will be described. As shown in FIG. 10, a case 14X of the guide 14 includes the upper wall 14U extending forward and downward. The case 14X of the guide 14 extends in the left-right direction. FIG. 17 is a perspective view of the guide 14, where the upper wall 14U and the auxiliary guide 15 are removed. The guide 14 includes a rear wall 14B, a lower wall 14D extending rearward from the upper wall 14U, a left wall 14L arranged leftward of the upper wall 14U, the rear wall 14B and the lower wall 14D, and a right wall 14R arranged rightward of the upper wall 14U, the rear wall 14B and the lower wall 14D.

Inlet ports 14*a* and outlet ports 14*b* are provided in the lower wall 14D. The upper wall 14U, the rear wall 14B, the lower wall 14D, the left wall 14L and the right wall 14R together define an air channel 14E extending from the inlet ports 14*a* to the outlet ports 14*b*. The inlet ports 14*a* are provided in the central portion 14CA when the guide 14 is divided into three equal portions in the left-right direction. The number of inlet ports 14*a* may be one or more. Here, two inlet ports 14*a* are provided. The inlet ports 14*a* include a left inlet port 14*a*L, and a right inlet port 14*a*R located rightward of the left inlet port 14*a*L. The number of outlet ports 14*b* may be one or more. Here, two outlet ports 14*b* are provided. The outlet ports 14*b* include a left outlet port 14*b*L and a right outlet port 14*b*R. The left outlet port 14*b*L and the right outlet port 14*b*R are provided in the left-side portion 14LA and the right-side portion 14RA when the guide 14 is divided into three equal portions in the left-right direction. The distance 14LR between the centers of the left inlet port 14*a*L and the right inlet port 14*a*R is shorter than the distance 14LL between the centers of the left inlet port 14*a*L and the left outlet port 14*b*L, and is shorter than the distance 14RR between the centers of the right inlet port 14*a*R and the right outlet port 14*b*R.

The guide 14 is provided with a cooling fan that flows air into the air channel 14E so that air drawn in through the inlet ports 14*a* flows through the air channel 14E and flows out through the outlet ports 14*b*. The cooling fan serves to cool the upper wall 14U by flowing air into the air channel 14E, which is partitioned by the upper wall 14U. Here, the cooling fan includes an intake fan 140A that is inside the guide 14 and connected to the inlet port 14*a*, and an exhaust fan 140B that is inside the guide 14 and connected to the outlet port 14*b*. The intake fan 140A draws air from the outside of the guide 14 into the air channel 14E from the downward side. The exhaust fan 140B discharges air from the air channel 14E downward to the outside of the guide 14. In the present preferred embodiment, the intake fan 140A and the exhaust fan 140B are axial flow fans.

While the material of the guide 14 is preferably a material with low thermal conductivity, an insulation material may be added while using a material with high thermal conductivity. The upper wall 14U, the rear wall 14B, the lower wall 14D, the left wall 14L and the right wall 14R, for example, may be formed by stainless steel or may be an iron plate with an insulation material attached thereon.

Figure 18:
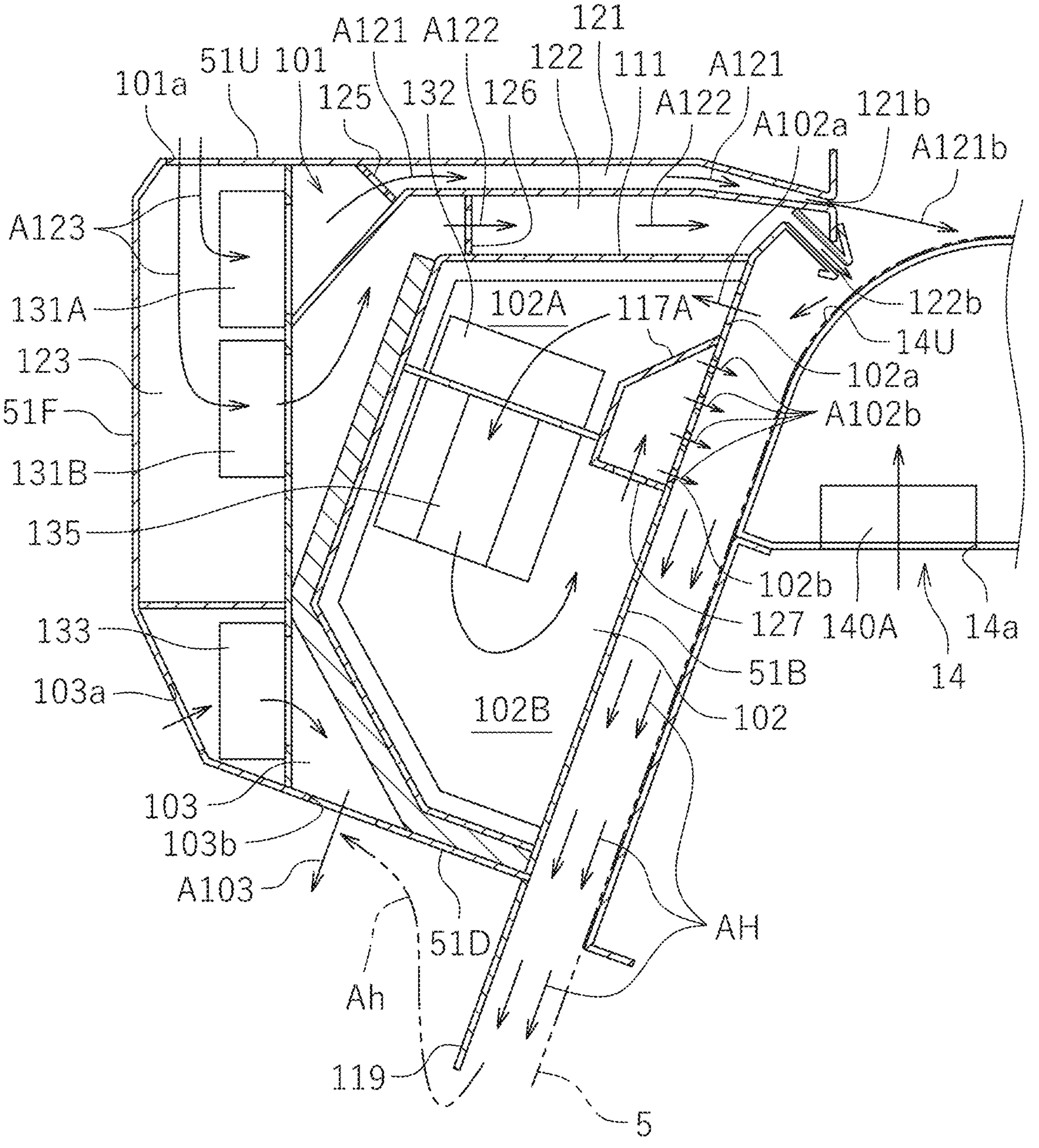
FIG. 18 is a diagram showing the air flow of the dryer according to the second preferred embodiment of the present invention.

Next, the operation of the dryer 50 will be described. The dryer 50 accelerates the drying of the ink on the recording medium 5 by blowing air onto the recording medium 5. Specifically, the dryer 50 accelerates initial drying of the ink by blowing air at room temperature onto the recording medium 5 on the platen 16. In addition, the dryer 50 accelerates complete drying of the ink by blowing hot air onto the recording medium 5 on the guide 14. FIG. 18 is a diagram showing the air flow in the dryer 50.

As shown in FIG. 18, air from the outside of the main body case 51 is drawn into the intake chamber 123 through the air-passing chamber intake ports 101*a* via the first air-passing chamber fans 131A and the second air-passing chamber fans 131B (see arrow A123). As indicated by arrow A121, the first air-passing chamber fans 131A send air from the intake chamber 123 to the first air-passing chamber 121, and discharge air to the platen 16 through the first air-passing chamber exhaust ports 121*b*. The room temperature air A121*b* discharged through the first air-passing chamber exhaust ports 121*b* is blown onto the recording medium 5 on the platen 16 to accelerate the drying of the ink on the recording medium 5.

As indicated by arrow A102*a*, the heated chamber fan 132 draws air from the outside of the main body case 51 from the heated chamber intake port 102*a* and sends the air from the upstream chamber 102A to the downstream chamber 102B. The air in the downstream chamber 102B is heated by the heater 135. While there is no particular limitation on the temperature of the heated air, it may be about 50° C. to about 110° C., for example. The heated, hot air is discharged through the heated chamber exhaust ports 102*b* as indicated by arrow A102*b*. The hot air discharged through the heated chamber exhaust ports 102*b* is blown onto the recording medium 5 on the guide 14 to accelerate the drying of the ink on the recording medium 5.

By way of example, since the air in the heated chamber 102 is hot, the partition wall 111 that divides between the heated chamber 102 and the air-passing chamber 101 is heated by the air in the heated chamber 102. The temperature of the partition wall 111 increases with the operation time of the dryer 50. Therefore, of the air in the air-passing chamber 101, the air that comes into contact with the partition wall 111 is heated and the temperature thereof increases. Therefore, when the second air-passing chamber 122 is not provided (e.g., in the case of the first preferred embodiment), the air A121 flowing in the first air-passing chamber 121 is heated by the partition wall 111 and becomes hotter than the outside air. If the air, which has become hot, flows out onto the platen 16, the pretreatment agent for image quality formation may become too dry, thus inhibiting reaction with the ink. If the hot air that flows onto the platen 16 also reaches the ink system (cap, wiper, etc.) side, the ink adhering to the ink system may easily dry out, thus causing nozzle clogging. However, according to the present preferred embodiment, the second air-passing chamber 122 is provided between the first air-passing chamber 121 and the heated chamber 102. The air A121 in the first air-passing chamber 121 does not come into contact with the partition wall 111. Therefore, the temperature increase of the air A121 in the first air-passing chamber 121 is prevented. The air A122 flowing in the second air-passing chamber 122 serves an insulating function to prevent the temperature increase of the air A121 in the first air-passing chamber 121. Therefore, it is possible to prevent relatively hot air from blowing onto the recording medium 5 on the platen 16. Note that the temperature of the air A122 flowing in the second air-passing chamber 122 is higher than that of the air A121 flowing in the first air-passing chamber 121. The temperature of the air discharged through the second air-passing chamber exhaust ports 122*b* is, for example, about 10° C. to about 20° C. higher than the temperature of the air discharged through the first air-passing chamber exhaust ports 121*b*.

The second air-passing chamber exhaust ports 122*b* are arranged downward of the first air-passing chamber exhaust ports 121*b* and upward of the heated chamber intake ports 102*a*. The second air-passing chamber exhaust ports 122*b* are arranged between the first air-passing chamber exhaust ports 121*b* and the heated chamber intake ports 102*a*. This prevents hot air from rising to the first air-passing chamber exhaust ports 121*b* between the rear wall 51B of the main body case 51 and the guide 14. The second air-passing chamber exhaust ports 122*b* have openings facing rearward and downward. Air discharged through the second air-passing chamber exhaust ports 122*b* flows downward along the rear wall 5B and the guide 14 (see arrow AH). Therefore, hot air is prevented from mixing with the room temperature air discharged through the first air-passing chamber exhaust ports 121*b*. The temperature of the air blown onto the recording medium 5 on the platen 16 is prevented from rising.

According to the present preferred embodiment, the dryer 50 includes the extension wall 119 extending forward and downward from the lower wall 51D or the rear wall 51B. As a result, hot air AH is prevented from moving around from the rear wall 51B to the lower wall 51D. The unheated chamber fan 133 takes room temperature air into the unheated chamber 103 through the unheated chamber intake ports 103*a* and blows out the room temperature air through the unheated chamber exhaust ports 103B. Even if the hot air Ah moves around to the lower wall 51D, the room temperature air A103 blown out through the unheated chamber exhaust ports 103*b* prevents the hot air Ah from moving around from the lower wall 51D to the front wall 51F. That is, the room temperature air A103 blown out from the unheated chamber exhaust ports 103B serves to block the rise of the hot air Ah. Therefore, according to the present preferred embodiment, the rise of the hot air Ah along the front wall 51F is prevented. The temperature of the front wall 51F is prevented from increasing. Note that the unheated chamber exhaust ports 103B have openings facing forward and downward. In the present preferred embodiment, the direction of the unheated chamber exhaust ports 103*b* is parallel to the direction of the rear wall 51B. This allows the hot air AH flowing downward along the rear wall 51B to be diffused farther downward.

In the present preferred embodiment, hot air Ah is prevented from rising along the front wall 51F, so that hot air Ah is prevented from being taken in through the air-passing chamber intake ports 101*a*. This also prevents the temperature rise of the air discharged through the first air-passing chamber exhaust ports 121*b* and the second air-passing chamber exhaust ports 122*b*, thus more effectively preventing the temperature rise of the air blown onto the recording medium 5 on the platen 16.

Hot air AH blown onto the recording medium 5 on the guide 14 flows downward in the space between the rear wall 51B and the guide 14. Now, hot air AH has a tendency to rise because of its low specific gravity. After hot air AH flows downward of the rear wall 51B of the main body case 51, the air may move around from the lower wall 51D to the front wall 51F and rise along the front wall 51F. In such a case, the front wall 51F may be heated by the hot air and the temperature of the front wall 51F may become high. The front wall 51F is a portion of the printer 10 that is closest to the operator who operates in front of the printer 10. Therefore, it is not preferable for the operator that the temperature of the front wall 51F becomes high.

As described above, hot air A102*b* discharged through the heated chamber exhaust ports 102*b* is blown onto the recording medium 5 on the upper wall 14U of the guide 14. Here, since the recording medium 5 moves forward and downward, the same portion of the recording medium 5 will not be continuously heated for a long time. On the other hand, the upper wall 14U of the guide 14 continues to be heated by hot air A102*b* via the recording medium 5 for a long time. Therefore, the temperature of the upper wall 14U of the guide 14 may become high. However, according to the present preferred embodiment, as shown in FIG. 17, the air channel 14E through which air flows is formed inside the guide 14. Air is drawn into the air channel 14E through the inlet ports 14*a*, flows through the air channel 14E, and then is discharged through the outlet ports 14*b*. This air cools the upper wall 14U as it flows through the air channel 14E. This prevents the temperature of the upper wall 14U from becoming high.

Next, various effects brought about by the printer 10 according to the present preferred embodiment will be described.

With the printer 10 according to the present preferred embodiment, the dryer 50 discharges air at room temperature through the first air-passing chamber exhaust ports 121*b* to the recording medium 5 on the platen 16. Thus, drying of the water-based ink is accelerated on the platen 16, and the quality of the image formed on the recording medium 5 can be improved. Furthermore, the dryer 50 discharges hot air heated by the heater 135 toward the recording medium on the guide 14 through the heated chamber exhaust ports 102*b*. This can further accelerate the drying of the water-based ink dispensed onto the recording medium 5 on the guide 14.

With the printer 10 according to the present preferred embodiment, between the first air-passing chamber 121 partitioned by the partition wall 111 and the heated chamber 102, the dryer 50 is provided with the second air-passing chamber 122 which is partitioned by the first air-passing chamber 121 and the partition wall 114 and in which room temperature air flows. The air in the second air-passing chamber 122 is discharged by the third fans 131B through the third exhaust ports 122*b*. Therefore, even when the air in the second air-passing chamber 122 is heated by the air in the heated chamber 102, the temperature rise inside the first air-passing chamber 121 is prevented. Thus, the temperature rise inside the first air-passing chamber 121 can be prevented, so that the temperature of the air discharged through the first air-passing chamber exhaust ports 121*b* can be prevented from becoming high. That is, the second air-passing chamber 122 arranged between the first air-passing chamber 121 and the heated chamber 102 serves an insulating function to prevent the temperature rise of the air A121 in the first air-passing chamber 121. Since the first air-passing chamber 121 is partitioned from the second air-passing chamber 122 by the partition wall 114, the air A121 of the first air-passing chamber 121 does not come into contact with the partition wall 111. Therefore, even if the air in the second air-passing chamber 122 is heated by the air in the heated chamber 102, the temperature rise of the air A121 in the first air-passing chamber 121 is prevented. Therefore, the temperature of the air discharged through the first air-passing chamber exhaust ports 121*b* is prevented from becoming high. If the temperature of the air discharged through the exhaust ports 121*b* is high, image quality degradation, nozzle clogging, and other problems will occur. Specifically, ink is dispensed from the ink head 35 onto the recording medium 5 on the platen 16, and if the ink (typically, a pretreatment agent that is one of the components of the ink and fixes water-based ink) dries too quickly, the quality of the image formed on the recording medium 5 may deteriorate. However, according to the present preferred embodiment, the temperature of the air blown onto the recording medium 5 on the platen 16 does not become high, so the drying of the ink can be accelerated without degrading the image quality. If the temperature of the air discharged through the first air-passing chamber exhaust ports 121*b* is too high, if the discharged air reaches the ink head 35, it may adhere to the ink head 35 and cause nozzle clogging or other problems. By preventing the rise in temperature of the air discharged through the first air-passing chamber exhaust ports 121*b*, nozzle clogging and other problems can be prevented even if the discharged air reaches the ink head 35.

According to the present preferred embodiment, the air discharged through the second air-passing chamber exhaust ports 122*b* is discharged from the downward side of the second air-passing chamber exhaust ports 122*b* and the upward side of the second exhaust ports 102*b*, i.e., from between the second air-passing chamber exhaust ports 122*b* and the second exhaust ports 102*b* in the up-down direction, toward the guide 14 or platen 16. Here, the hot air discharged through the second exhaust ports 102*b* may flow upward and rearward along the upper wall 14U because of its high temperature. If the air flows upward and rearward, there is a possibility that the discharged hot air may mix with the air discharged through the first air-passing chamber exhaust ports 121*b* and blown onto the platen 16. Even in this case, the upward flow of air discharged through the second exhaust ports 102*b* is obstructed by the flow of air discharged through the second air-passing chamber exhaust ports 122*b*. Therefore, the hot air discharged through the heated chamber exhaust ports 102*b* can effectively prevent the air from mixing with the air discharged through the first air-passing chamber exhaust ports 121*b*. Therefore, the temperature of the air blown onto the recording medium 5 on the platen 16 is prevented from becoming high, and the drying of ink can be accelerated without degrading the image quality. The air discharged through the second air-passing chamber exhaust ports 122*b* flows out rearward and downward toward the upper wall 14U of the guide 14 at a position rearward relative to the second intake ports 102*a*. The rearward and downward air flow pushes, forward and downward, the hot air discharged through the second exhaust ports 102*b* and flowing out rearward and upward along the upper wall 14U to accelerate suction into the second intake ports 102*a*. This allows heated air to circulate efficiently outside and inside the heated chamber 102.

According to the present preferred embodiment, the air-blowing speed of the second air-passing chamber exhaust ports 122*b* is greater than the air-blowing speed of the first air-passing chamber exhaust ports 121*b*. The velocity of the air blown out of the second air-passing chamber exhaust ports 122*b* is relatively large. Therefore, it is possible to effectively prevent the hot air discharged through the heated chamber exhaust ports 102*b* from mixing with the air discharged through the first air-passing chamber exhaust ports 121*b*. Thus, the temperature of the air blown onto the recording medium 5 on the platen 16 is prevented from becoming high, and the drying of the ink can be accelerated without degrading the image quality.

According to the present preferred embodiment, the air-passing chamber 101 includes an intake chamber 123 that connects to the first air-passing chamber 121 and the second air-passing chamber 122. The air-passing chamber intake ports 101*a* are structured to take air from outside the main body case 51 into the intake chamber 123. There is no need to provide separate intake ports for the first air-passing chamber 121 and intake ports for the second air-passing chamber 122. Thus, the number of intake ports can be reduced.

The heated chamber exhaust ports 102*b* are arranged downward relative to the heated chamber intake ports 102*a*. A portion of the air heated by the heater 135 is discharged through the heated chamber exhaust ports 102*b* and then drawn into the heated chamber 102 through the heated chamber intake ports 102*a* to be reheated by the heater 135. Heated air can be circulated outside and inside the heated chamber 102. Therefore, it is possible to increase the heating efficiency of the air in the heated chamber 102. It is possible to accelerate drying of the water-based ink with less power consumption.

The dimension in the up-down direction of the first exhaust channel 121A of the first air-passing chamber 121 gradually becomes smaller toward the rear side. Thus, it is possible to pass a rectified airflow through the first air-passing chamber exhaust ports 121*b* to the platen 16.

The first air-passing chamber exhaust ports 121*b* are located rearward relative to the heated chamber exhaust ports 102*b*. This allows air to be more reliably sent toward the platen 16 through the first air-passing chamber exhaust ports 121*b*.

The heated chamber intake ports 102*a* are arranged downward relative to the first air-passing chamber exhaust ports 121*b*. Therefore, air with high temperature downward relative to the heated chamber intake ports 102*a* rises along the guide 14, but much of the air is sucked into the heated chamber 102 by the heated chamber intake ports 102*a*. Therefore, the air flow from the first air-passing chamber exhaust ports 121*b* toward the platen 16 is less likely to be obstructed.

With the printer 10 according to the present preferred embodiment, hot air is discharged from the heated chamber 102 through the heated chamber exhaust ports 102*b*. A portion of the discharged hot air flows upward by a circulation path after being discharged through the heated chamber exhaust ports 102*b* and is sucked into the heated chamber 102 through the heated chamber intake port 102*a*, but a portion flows forward and downward between the rear wall 51B of the main body case 51 and the recording medium 5 on the guide 14. The hot air flowing out forward and downward reaches the vicinity of the lower wall 51D of the main body case 51, and then rises along the front wall 51F of the main body case 51. When hot air rises along the front wall 51F of the main body case 51, problems occur, such as the front wall 51F of the main body case 51 becoming hot. In contrast, with the printer 10 according to the present preferred embodiment, the unheated chamber exhaust ports 103*b* to discharge the air of the unheated chamber 103 are provided in the lower wall 51D arranged between the air-passing chamber intake ports 101*a* and the rear wall 51B of the main body case 51. The air discharged through the unheated chamber exhaust ports 103*b* becomes an air curtain, which prevents hot air from flowing along the lower wall 51D and into the front wall 51F. Therefore, hot air is prevented from rising along the front wall 51F. Therefore, with the printer 10 according to the present preferred embodiment, the front portion of the main body case 51 of the dryer 50 can be prevented from becoming hot.

With the printer 10 according to the present preferred embodiment, the air-passing chamber intake ports 101*a* are provided in the upper wall 51U of the main body case 51. Therefore, when hot air rises along the front wall 51F of the main body case 51, the temperature of air sucked in through the air-passing chamber intake ports 101*a* may become high. However, since the hot air is prevented from rising along the front wall 51F of the main body case 51, the temperature of the air sucked in through the air-passing chamber intake ports 101*a* can be prevented from becoming high. Therefore, it is possible to prevent the temperature of the air discharged through the first air-passing chamber exhaust ports 121*b* from becoming high. As a result, since it is possible to prevent the temperature rise of the air blown onto the recording medium 5 on the platen 16, it is possible to prevent the image quality from degrading due to excessive drying of the ink, and to prevent nozzle clogging.

While there is no particular limitation on the positional relationship between the unheated chamber intake ports 103*a* and the unheated chamber exhaust ports 103*b*, the unheated chamber intake ports 103*a* are arranged forward relative to the unheated chamber exhaust ports 103*b* in the present preferred embodiment. The unheated chamber intake ports 103*a* are arranged relatively far from the rear wall 51B of the main body case 51. This can effectively prevent hot air from rising along the front wall 51F. Even if the hot air flows forward relative to the unheated exhaust ports 103*b*, the hot air will be sucked in through the unheated chamber intake ports 103*a*. Therefore, it is possible to prevent the hot air from being sucked in through the air-passing chamber intake ports 101*a*.

In the present preferred embodiment, the unheated chamber intake ports 103*a* are provided on the front wall 51F of the main body case 51. Even if hot air moves around from the lower wall 51D of the main body case 51 to the front wall 51F, the hot air will be sucked into the unheated chamber 103 through the unheated exhaust ports 103*a*. This also effectively prevents the hot air from rising along the front wall 51F.

The air-passing chamber intake port 101*a* is arranged upward relative to the unheated chamber intake ports 103*a*. Therefore, it is possible to prevent hot air from being sucked into the air-passing chamber 101. Since the temperature of the air blown onto the recording medium 5 on the platen 16 does not become high, it is possible to prevent the image quality from degrading due to excessive drying of the ink, and to prevent and nozzle clogging.

According to the present preferred embodiment, the air-passing chamber intake ports 101*a* are provided in the upper wall 51U of the main body case 51. Even if hot air rises along the front wall 51F, it will be possible to prevent the hot air from being sucked into the air-passing chamber 101.

According to the present preferred embodiment, the air-passing chamber 101 and the unheated chamber 103 are separated by the partition wall 112. It is possible to further prevent the temperature of the air in the air-passing chamber 101 from becoming high. Even if hot air is taken into the unheated chamber 103 through the unheated chamber intake ports 103*a*, the temperature of the air in the air-passing chamber 101 will be prevented from becoming high.

With the printer 10 according to the present preferred embodiment, the guide 14 includes the air channel 14E with the inlet ports 14*a* and the outlet ports 14*b*, and cooling fans 140. Air from outside the guide 14 is sucked in through the inlet ports 14*a* to flow through the air channel 14E, and is discharged through the outlet ports 14*b*. Therefore, the guide 14 is cooled by the air flowing through the air channel 14E. Thus, it is possible to prevent the guide 14 from becoming hot.

While there is no particular limitation on the positions of the inlet ports 14*a* and the outlet ports 14*b*, the inlet ports 14*a* are arranged at the central portion 14CA of the guide 14 in the present preferred embodiment. The outlet ports 14*b* include the left exhaust outlet 14*b*L arranged in the left portion 14LA of the guide 14 and the right exhaust outlet 14*b*R arranged in the right portion 14RA of the guide 14. The central portion 14CA of the guide 14 tends to be hotter than the opposite end portions of the guide 14 because it tends to retain more heat. However, since the inlet ports 14*a* are arranged in the central portion 14CA, relatively cold air that has just been taken in from the outside flows in the central portion 14CA. Therefore, it is possible to sufficiently cool the central portion 14CA. Since the left exhaust port 14*b*L and the right exhaust port 14*b*R are closer to the end portions of the guide 14 than the central portion 14CA, the outside air taken into the inside of the guide 14 through the inlet ports 14*a* is divided into the right side and the left side to flow toward the opposite ends. According to the present preferred embodiment, it is possible to efficiently cool the guide 14 over the entirety in the longitudinal direction.

While there is no particular limitation on the number of inlet ports 14*a* of the air channel 14E, a plurality of inlet ports 14*a* are provided in the present preferred embodiment. The inlet ports 14*a* include the left inlet port 14*a*L and the right inlet port 14*a*R. This allows a sufficient amount of air to be taken into the air channel 14E to efficiently cool the guide 14.

In the present preferred embodiment, the distance 14LR between the centers of the left inlet port 14*a*L and the right inlet port 14*a*R is shorter than the distance 14LL between the centers of the left inlet port 14*a*L and the left outlet port 14*b*L. The distance 14LR is shorter than the distance 14RR between the centers of the right inlet port 14*a*R and the right outlet port 14*b*R. Although air tends to remain in the area between the left inlet port 14*a*L and the right inlet port 14*a*R in the air channel 14E, the area where air remains is small because the distance 14LR between the left inlet port 14*a*L and the right inlet port 14*a*R is short in the present preferred embodiment. Therefore, it is possible to efficiently cool the guide 14.

While the inlet ports 14*b* may be provided in the left wall 14L or the right wall 14R, they are provided in the lower wall 14D in the present preferred embodiment. It is possible to prevent the inflow of air through the inlet ports 14*a* from affecting the drying of the recording medium 5 on the upper wall 14U.

While the outlet ports 14*b* may be provided on the left wall 14L or the right wall 14R, they are provided in the lower wall 14D in the present preferred embodiment. It is possible to prevent air discharged through the outlet ports 14*b* from affecting the drying of the recording medium 5 on the upper wall 14U.

According to the present preferred embodiment, the cooling fans 140 include the exhaust fan 140B connected to the outlet port 14*b*. Thus, it is possible to desirably discharge air from the air channel 14E.

According to the present preferred embodiment, the cooling fans 140 include the intake fan 140A connected to the inlet ports 14*a*. Thus, it is possible to desirably take air into the air channel 14E.

With the printer 10 according to the present preferred embodiment, the dryer 50 includes the first air-passing chamber 121 and the second air-passing chamber 122, and the first air-passing chamber fans 131A is provided for the first air-passing chamber 121 and the second air-passing chamber fans 131B is provided for the second air-passing chamber 122. The first air-passing chamber fans 131A and the second air-passing chamber fans 131B are arranged so as to pass air from different air-passing chambers, but are attached to a common mounting plate 115. The mounting plate 115 is removably connected to the main body case 51. Therefore, the first air-passing chamber fans 131A and the second air-passing chamber fans 131B can be easily assembled to the main body case 51 by attaching the first air-passing chamber fans 131A and the second air-passing chamber fans 131B to the mounting plate 115, and connecting the mounting plate 115 to the main body case 51.

The air-passing chamber 101 of the main body case 51 is partitioned into the first air-passing chamber 121, the second air-passing chamber 122 and the intake chamber 123, and the air-passing chamber intake ports 101*a* connect together the outside of the main body case 51 and the intake chamber 123. The first air-passing chamber fans 131A and the second air-passing chamber fans 131B are arranged in the intake chamber 123. As the dryer 50 has such a configuration, the mounting plate 115, to which the first air-passing chamber fans 131A and the second air-passing chamber fans 131B are attached, can be easily assembled to the main body case 51. The dryer 50 including the first air-passing chamber fans 131A and the second air-passing chamber fans 131B can be made smaller.

According to the present preferred embodiment, the first air-passing chamber fans 131A and the second air-passing chamber fans 131B are arranged parallel to each other. The first air-passing chamber fans 131A and the second air-passing chamber fans 131B are configured to send air rearward in the horizontal direction. The first air-passing chamber fans 131A and the second air-passing chamber fans 131B are arranged next to each other in the up-down direction. As the dryer 50 has such a configuration, the mounting plate 115, to which the first air-passing chamber fans 131A and the second air-passing chamber fans 131B are attached, can be easily assembled to the main body case 51. The dryer 50 including the first air-passing chamber fans 131A and the second air-passing chamber fans 131B can be made smaller.

While there is no particular limitation on the number of first air-passing chamber fans 131A and second air-passing chamber fans 131B, a plurality of first air-passing chamber fans 131A are arranged in the left-right direction and a plurality of second air-passing chamber fans 131B are arranged in the left-right direction in the present preferred embodiment. All those first air-passing chamber fans 131A and second air-passing chamber fans 131B are attached to a common mounting plate 115. Therefore, a plurality of first air-passing chamber fans 131A and a plurality of second air-passing chamber fans 131B can be easily assembled to the main body case 51.

According to the present preferred embodiment, in addition to the first air-passing chamber fans 131A and the second air-passing chamber fans 131B, the unheated chamber fans 133 are also attached to the mounting plate 115. Therefore, the first air-passing chamber fans 131A, the second air-passing chamber fans 131B and the unheated chamber fans 133 can all be easily assembled to the main body case 51. Note that the heated chamber fans 132 are not attached to the mounting plate 115. The first air-passing chamber fans 131A, the second air-passing chamber fans 131B and the unheated chamber fans 133 blow air at room temperature or substantially room temperature, but the heated chamber fans 132 sends hot air because hot air circulates in the heated chamber 102. The specifications of the heated chamber fans 132 are often different from the specifications of the first air-passing chamber fans 131A, the second air-passing chamber fans 131B and the unheated chamber fans 133. In the present preferred embodiment, a plurality of fans that send air at room temperature or substantially room temperature are attached to the mounting plate 115 in a localized manner. Note, however that the present preferred embodiment is only one example, and there is no particular limitation thereto.

According to the present preferred embodiment, a first rectifying plate 125 with a plurality of through-holes 120*h* is arranged inside the first air-passing chamber 121. A second rectifying plate 126 with a plurality of through-holes 120*h* is arranged inside the second air-passing chamber 122. This allows for uniform velocity distribution of the air discharged through the first air-passing chamber exhaust ports 121*b*. The velocity distribution of the air discharged through the second air-passing chamber exhaust ports 122*b* can be made uniform. Because the velocity distribution of the air can be made uniform, there are only a few restrictions regarding the orientation of the first air-passing chamber fans 131A and the second air-passing chamber fans 131B.

The dryer 50 includes the printed circuit board 150 connected to the first air-passing chamber fans 131A and the second air-passing chamber fans 131B via wires 151. This printed circuit board 150 is also attached to the mounting plate 115. Therefore, each of the first air-passing chamber fans 131A, the second air-passing chamber fans 131B and the printed circuit board 150 can be easily assembled to the main body case 51 by attaching them to the same mounting plate 115. By arranging the printed circuit board 150 sideward of the first air-passing chamber fans 131A and the second air-passing chamber fans 131B, the printed circuit board 150 can be effectively cooled by the airflow generated by the first air-passing chamber fans 131A and the second air-passing chamber fans 131B.

With the printer 10 according to the present preferred embodiment, the heated chamber fans 132 of the dryer 50 are spaced apart from each other and are arranged next to each other in the left-right direction, but the heated chamber exhaust ports 102*b* are arranged upward relative to the midpoint of a rear wall 50B of the main body case 51 in the up-down direction. The heated chamber exhaust ports 102*b* are not arranged evenly over the entire extent of the rear wall 50B, but are concentrated in an upper portion of the rear wall 50B. Thus, it is possible to increase the air pressure in an area of the heated chamber 102 before the heated chamber exhaust ports 102*b*. Thus, the velocity distribution of the air blown onto the recording medium 5 through the heated chamber exhaust ports 102*b* can be made more uniform than before. Thus, the drying of the ink on the recording medium 5 can be effectively accelerated on the guide 14.

The air in the heated chamber 102 is heated by the heater 135 provided at the exit of the heated chamber fans 132. According to the present preferred embodiment, the velocity distribution of the air discharged through the heated chamber exhaust ports 102*b* is made uniform, so that the temperature distribution of the air blown onto the recording medium 5 on the guide 14 can be made uniform. The recording medium 5 can be heated evenly and the drying of the ink on the recording medium 5 can be effectively accelerated.

A third rectifying plate 127 with a plurality of through-holes 120*h* is arranged in the heated chamber 102. With the third rectifying plate 127, the velocity distribution of the air flowing through the heated chamber 102 can be made uniform. Thus, the velocity distribution of the air blown onto the recording medium 5 through the heated chamber exhaust ports 102*b* can be made more uniform.

According to the present preferred embodiment, the air discharged through the heated chamber exhaust ports 102*b* flows forward and downward in the space between the rear wall 51B of the main body case 51 and the upper wall 14U of the guide 14. The air discharged through the heated chamber exhaust ports 102*b* is prevented from rising. The air discharged through the heated chamber exhaust ports 102*b* and flowing forward and downward can accelerate drying of the ink on the recording medium 5.

The dryer 50 includes the extension wall 119 extending forward and downward arranged downward of the rear wall 51B of the main body case 51. This prevents hot air from moving around from the rear wall 51B to the lower wall 51D. Thus, hot air is prevented from rising along the front wall 51F.

According to the present preferred embodiment, the first air-passing chamber exhaust ports 121*b* are arranged upward relative to the heated chamber exhaust ports 102*b*. The first air-passing chamber exhaust ports 121*b* are arranged rearward relative to the heated chamber exhaust ports 102*b*. Air discharged through the heated chamber exhaust ports 102*b* desirably flows forward and downward in the space between the rear wall 51B of the main body case 51 and the upper wall 14U of the guide 14. The air discharged through the heated chamber exhaust port 102*b* and flowing forward and downward can accelerate drying of the ink on the recording medium 5.

Preferred embodiments of the present invention have been described above. However, the preferred embodiments described above are merely examples, and the present invention can be implemented in various other forms.

Figure 19:
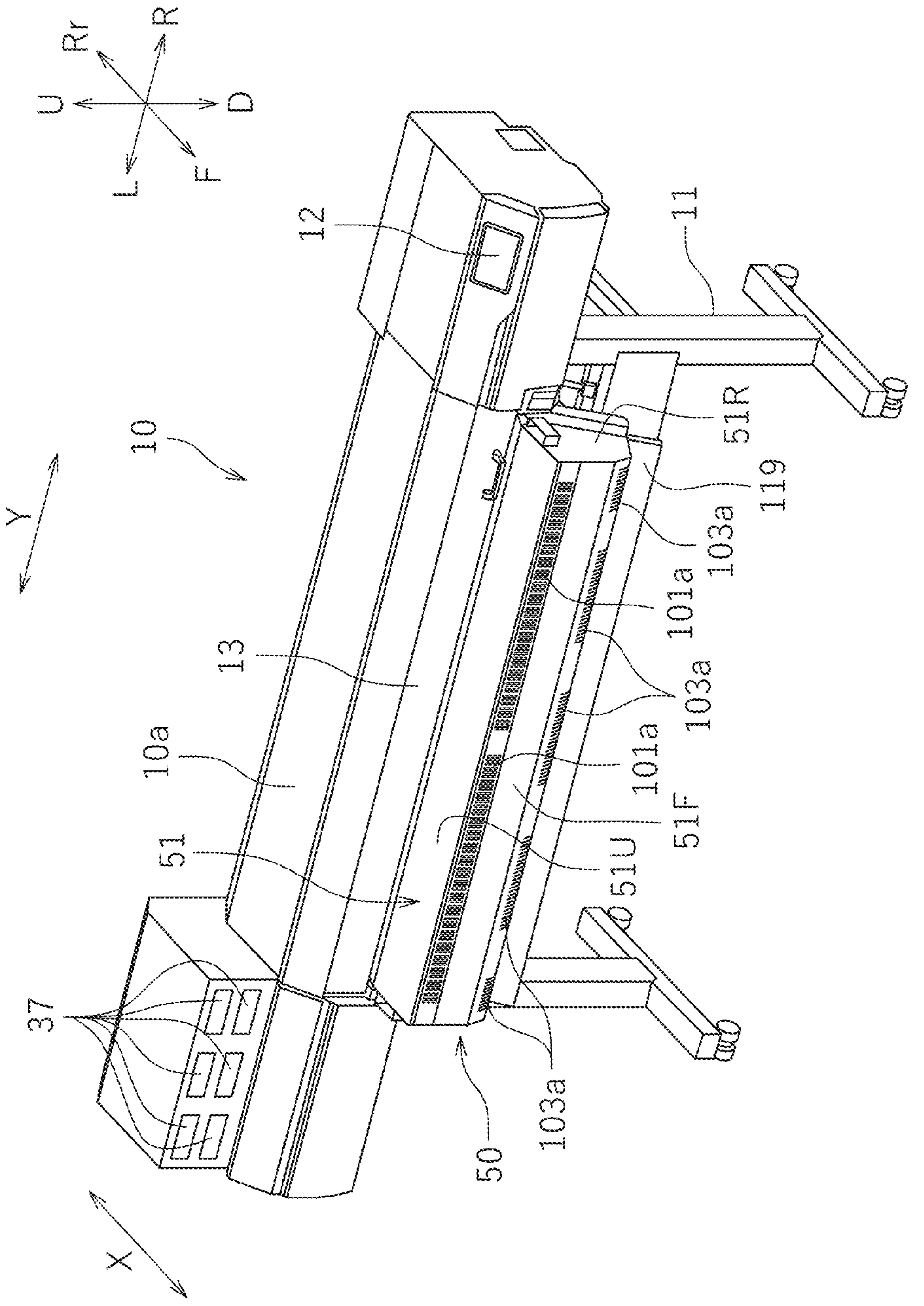
FIG. 19 is a perspective view of a printer according to a variation of the second preferred embodiment of the present invention.

In the second preferred embodiment described above, the air-passing chamber intake ports 101*a* are provided in the upper wall 51U of the main body case 51 (see FIG. 10). However, as shown in FIG. 19, the air-passing chamber intake ports 101*a* may be provided in an upper portion of the front wall 51F of the main body case 51. When the air-passing chamber intake ports 101*a* are provided in the upper wall 51U of the main body case 51, falling objects may enter the main body case 51 through the air-passing chamber intake ports 101*a*. Therefore, the position and the range of the air-passing chamber intake ports 101*a* are restricted in order to prevent the falling object from getting caught in the first air-passing chamber fans 131A and the second air-passing chamber fans 131B. If an object is placed on the upper wall 51U of the main body case 51, some of the air-passing chamber intake ports 101A may be blocked by the object, and the amount of air taken into the main body case 51 may change. If the area where the air-passing chamber intake ports 101*a* are blocked is large, the amount of air taken into the main body case 51 may not be secured. In contrast, if the air-passing chamber intake ports 101*a* are provided in the front wall 51F of the main body case 51, the problem described above does not occur. On the other hand, an upper portion of the front wall 51F of the main body case 51, where the air-passing chamber intake ports 101*a* are arranged, is a portion that overlaps with a portion of the second air-passing chamber 122 of the air-passing chamber 101 that extends in the front-rear direction as seen in a front view, and is set at the highest position of the main body case 51. Therefore, even with the front wall 51F of the main body case 51, if it is at the highest position of the main body case 51, the temperature of the air taken in through the air-passing chamber intake ports 101*a* can be maintained appropriately even if the air-passing chamber intake ports 101*a* are arranged in that portion.

There is no limitation on the shape of the various intake ports and exhaust ports of the preferred embodiments described above. The intake ports and the exhaust ports may have a circular shape, an elliptical shape, a rectangular shape, a slit shape, etc.

While the downstream guide 18 and the auxiliary guide 15 of the guide 14 may be separate from each other in the preferred embodiment described above, the downstream guide 18 and the auxiliary guide 15 may be integral with each other. The printer 10 does not need to include the auxiliary guide 15.

The printer 10 may include a platen heater that heats the platen 16. If the printer 10 includes a platen heater, for example, the platen heater is provided on the reverse surface of the platen 16. If the printer 10 includes a platen heater, initial drying may not be performed. The printer 10 may also include a downstream guide heater that heats the downstream guide 18. If the printer 10 includes a downstream guide heater, for example, the downstream guide heater is provided on the reverse surface of the downstream guide 18.

The second air-passing chamber exhaust ports 122*b* is not necessarily arranged rearward relative to the heated chamber exhaust ports 102*b*. The second air-passing chamber exhaust ports 122*b* do not need to have openings facing rearward and downward.

The air-blowing speed of the second air-passing chamber exhaust ports 122*b* may be less than or equal to the air-blowing speed of the first air-passing chamber exhaust ports 121*b*.

The air-passing chamber 101 does not need to include the intake chamber 123. For example, the dryer 50 may separately include an intake port to take air into the first air-passing chamber 121 and an intake port to take air into the second air-passing chamber 122, wherein the first air-passing chamber fans 131A may be arranged in the first air-passing chamber 121 and the second air-passing chamber fans 131B may be arranged in the second air-passing chamber 122.

The unheated chamber 103 may be optional. For example, the unheated chamber 103 may be omitted if the front wall 51F of the main body case 51 does not become hot.

The air channel 14E, the intake fan 140A and the exhaust fan 140B of the guide 14 may be optional. If there is no need to cool the guide 14, they may be omitted.

Two or three of the first air-passing chamber fans 131A, the second air-passing chamber fans 131B and the unheated chamber fans 133 may be attached to separate mounting plates.

The heated chamber exhaust ports 102*b* do not need to be positioned upward relative to the midpoint of the rear wall 51B of the main body case 51 in the up-down direction. Some or all of the heated chamber exhaust ports 102*b* may be positioned downward relative to the midpoint of the rear wall 51B in the up-down direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inkjet printer comprising:
- a platen to support a recording medium;
- a carriage positioned upward relative to the platen and movable in a left-right direction;
- an ink head provided on the carriage to dispense water-based ink onto the recording medium;
- a guide including an upper wall on which the recording medium is able to be placed, and positioned downstream in a conveyance direction relative to the platen to guide movement of the recording medium, the upper wall extending downstream in the conveyance direction and below the platen; and
- a dryer opposing the upper wall of the guide to send an airflow toward the recording medium on the guide; wherein
- the dryer includes:
  - a main body case extending in the left-right direction;
  - a first partition wall that partitions an inside of the main body case into a first chamber and a second chamber;
  - one or more first fans provided in the first chamber;
  - one or more second fans provided in the second chamber;
  - a heater provided in the second chamber to heat air that is sent by the second fan;
  - a first intake port provided in the main body case to take in air from outside the main body case into the first chamber;
  - a first exhaust port provided in the main body case and including an opening facing toward the platen to discharge air of the first chamber;
  - a second intake port provided in the main body case and including an opening facing toward the upper wall of the guide to take in air from outside the main body case into the second chamber; and
  - a second exhaust port provided in the main body case below the first exhaust port and including an opening facing toward the upper wall of the guide to discharge air of the second chamber that has been heated by the heater;
- the first chamber is not provided with any heater;
- the upper wall of the guide is directly adjacent to the platen and positioned downstream thereof in the conveyance direction;
- the first exhaust port faces toward the platen or the upper wall of the guide;
- the main body case includes a rear wall opposing the guide;
- the first chamber includes a first exhaust channel that connects to the first exhaust port; and
- the first exhaust channel protrudes from and extends beyond the rear wall in a direction toward the platen.

2. The inkjet printer according to claim 1, wherein the second intake port is positioned downward relative to the first exhaust port.

3. The inkjet printer according to claim 1, wherein
- the main body case includes an outer wall that partitions between an outside of the main body case and the first chamber; and
- a thermal conductivity of the first partition wall is lower than a thermal conductivity of the outer wall.

4. The inkjet printer according to claim 1, wherein
- a channel cross-sectional area of the first exhaust channel decreases upstream in the conveyance direction.

5. The inkjet printer according to claim 1, wherein the first intake port is provided in a front portion of the main body case.

6. The inkjet printer according to claim 1, wherein the first exhaust port is positioned rearward relative to the second exhaust port.

7. The inkjet printer according to claim 1, wherein the second intake port is positioned downward relative to the first exhaust port.

8. The inkjet printer according to claim 1, wherein:
- the dryer includes a second partition wall that partitions an inside of the first chamber into a first air-sending chamber and a second air-sending chamber;
- the first partition wall partitions between the second air-sending chamber and the second chamber;
- the first fan is operable to send air of the first air-sending chamber;
- the first exhaust port is operable to discharge air of the first air-sending chamber; and
- the dryer includes:
  - a third exhaust port provided in the main body case to discharge air of the second air-sending chamber; and
  - a third fan to send air of the second air-sending chamber.

9. The inkjet printer according to claim 8, wherein the third exhaust port is positioned downward relative to the first exhaust port and upward relative to the second exhaust port, and includes an opening facing toward the platen or the upper wall of the guide.

10. The inkjet printer according to claim 8, wherein the third exhaust port is positioned rearward relative to the second intake port, and includes an opening facing rearward and downward toward the upper wall of the guide.

11. The inkjet printer according to claim 8, wherein the first fan and the third fan are set so that an air-blowing speed of the third exhaust port is greater than an air-blowing speed of the first exhaust port.

12. The inkjet printer according to claim 8, wherein
- the first chamber includes an intake chamber that connects to the first air-sending chamber and the second air-sending chamber; and
- the first intake port is structured to take in air from outside the main body case into the intake chamber.

13. The inkjet printer according to claim 1, wherein
- the main body case includes a lower wall extending forward relative to a lower end of the rear wall, a front wall extending upward relative to a front end of the lower wall, and an upper wall extending rearward relative to an upper end of the front wall; and
- the first intake port is provided in the front wall of the main body case.

14. The inkjet printer according to claim 1, wherein the main body case includes a lower wall extending forward relative to a lower end of the rear wall, a front wall extending upward relative to a front end of the lower wall, and an upper wall extending rearward relative to an upper end of the front wall;

the second exhaust port is provided in the rear wall; and the dryer includes:

a third chamber provided inside the main body case such that a portion of the third chamber is defined by the lower wall;

a fourth fan provided in the third chamber; and a fourth exhaust port provided in the lower wall of the main body case to discharge air of the third chamber.

15. The inkjet printer according to claim 1, wherein the guide includes:

a case including the upper wall and extending in the left-right direction;

an inlet port provided in the case through which air is taken from outside the case into the case; and an outlet port provided in the case to discharge air from inside the case to outside the case;

an air channel extending from the inlet port toward the outlet port is provided inside the case; and the inkjet printer includes a cooling fan to send air to the air channel of the guide so that air that is sucked in through the inlet port flows through the air channel to be discharged through the outlet port.

16. The inkjet printer according to claim 1, wherein the dryer includes a mounting plate connected to the main body case;

the mounting plate partitions a portion of the first chamber;

a plurality of first fans are provided in the first chamber; and the plurality of first fans are attached to the mounting plate.

17. The inkjet printer according to claim 1, wherein a portion of the second chamber is partitioned by the rear wall;

the second exhaust port is provided in the rear wall and communicates an outside of the main body case and the second chamber;

the second fan sends air of the second chamber so that air from outside the second chamber is sucked into the second chamber through the second intake port and the air of the second chamber is discharged through the second exhaust port;

the second chamber includes an upstream chamber into which air from outside is taken through the second intake port, a downstream chamber into which air that has been taken into the upstream chamber and pressurized by the second fan flows, and an exit chamber that is partitioned from the upstream chamber and the downstream chamber and connects to the downstream chamber;

a pressure of the upstream chamber is set to a negative pressure, a pressure of the downstream chamber is set to a positive pressure, and a pressure of the exit chamber is set to a positive pressure lower than the pressure of the downstream chamber; and the second exhaust port is provided in the exit chamber.

18. The inkjet printer according to claim 1, wherein the dryer includes an extension wall positioned downward relative to the rear wall, and extending downward.

19. The inkjet printer according to claim 1, wherein the first exhaust port has a slit shape extending in the left-right direction.

* * * * *